United States Patent [19]

Heuft

[11] 4,369,873

[45] Jan. 25, 1983

[54] APPARATUS FOR LATERALLY DEFLECTING ARTICLES

[76] Inventor: Bernhard Heuft, Im Sonnenwinkel 14, 5475 Burgbrohl, Fed. Rep. of Germany

[21] Appl. No.: 2,261

[22] Filed: Jan. 10, 1979

[30] Foreign Application Priority Data

Jan. 13, 1978 [DE] Fed. Rep. of Germany ....... 2801387

[51] Int. Cl.$^3$ ..................... B65G 37/00; B65G 47/10; B65G 47/26
[52] U.S. Cl. ................................ 198//367; 198/372; 198/442
[58] Field of Search ............... 198/367, 372, 442, 597, 198/599; 209/657

[56] References Cited

U.S. PATENT DOCUMENTS 2,036,421 4/1936 Luckie ................................ 198/442

FOREIGN PATENT DOCUMENTS 6802506 8/1968 Netherlands ....................... 209/657

Primary Examiner—Robert B. Reeves
Assistant Examiner—Brian Bond
Attorney, Agent, or Firm—Pollock, Vande Sande & Priddy

[57] ABSTRACT

Apparatus for laterally deflecting articles, such as bottles, from the normal path of a series of such articles, on the basis of a predetermined criterion, such as size or shape. The apparatus may be in the form of extensors which operate transversely to the direction of travel of the articles, in such manner that at any given moment only those extensors are extended which contact the article then being deflected.

8 Claims, 24 Drawing Figures

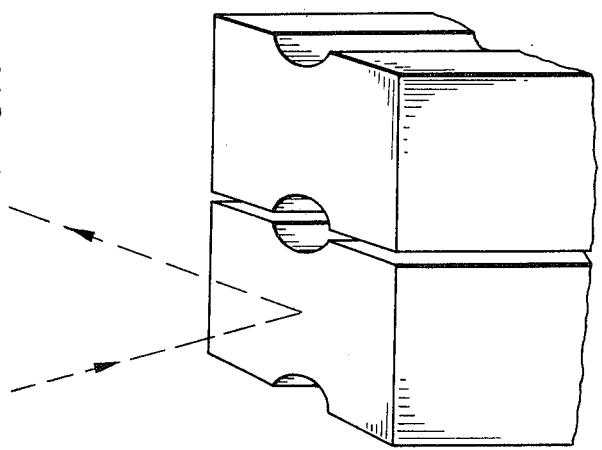
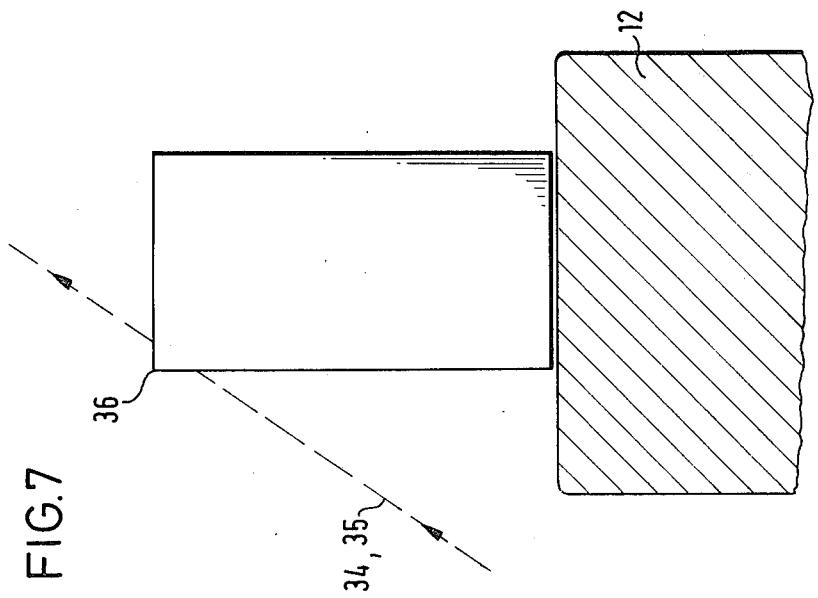

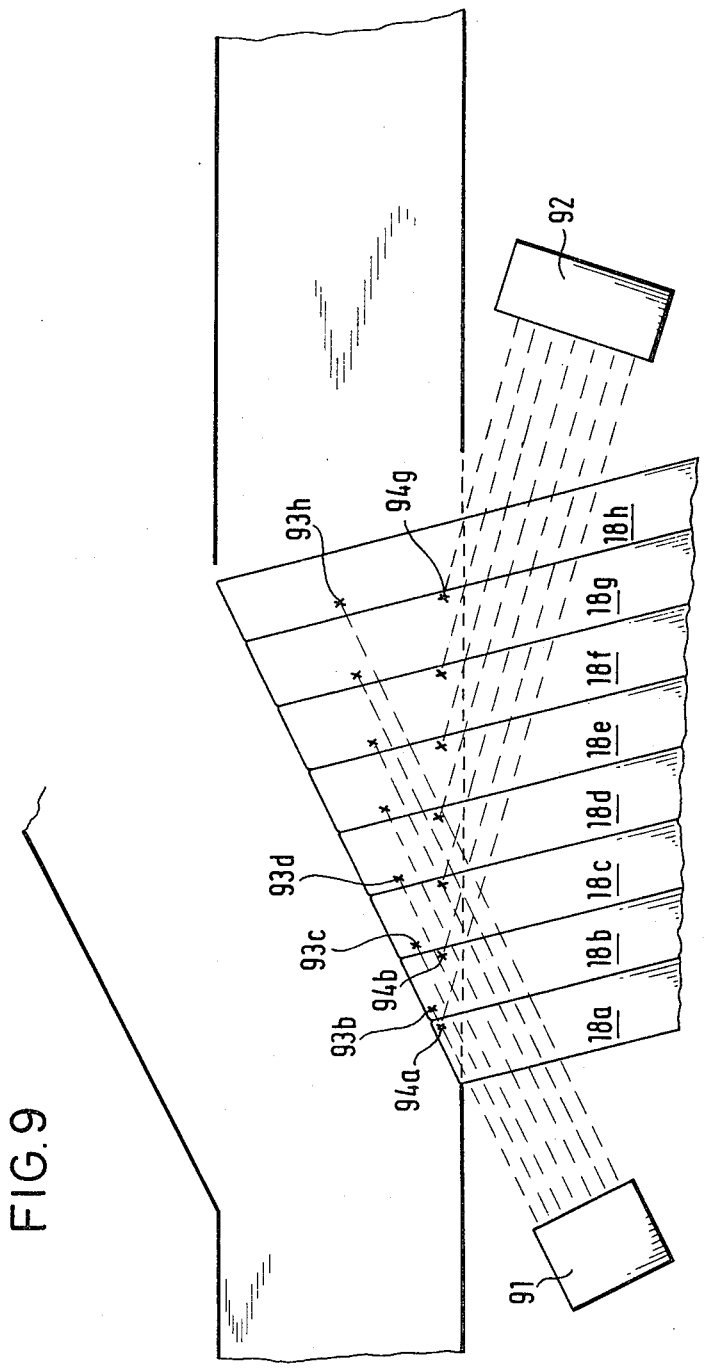

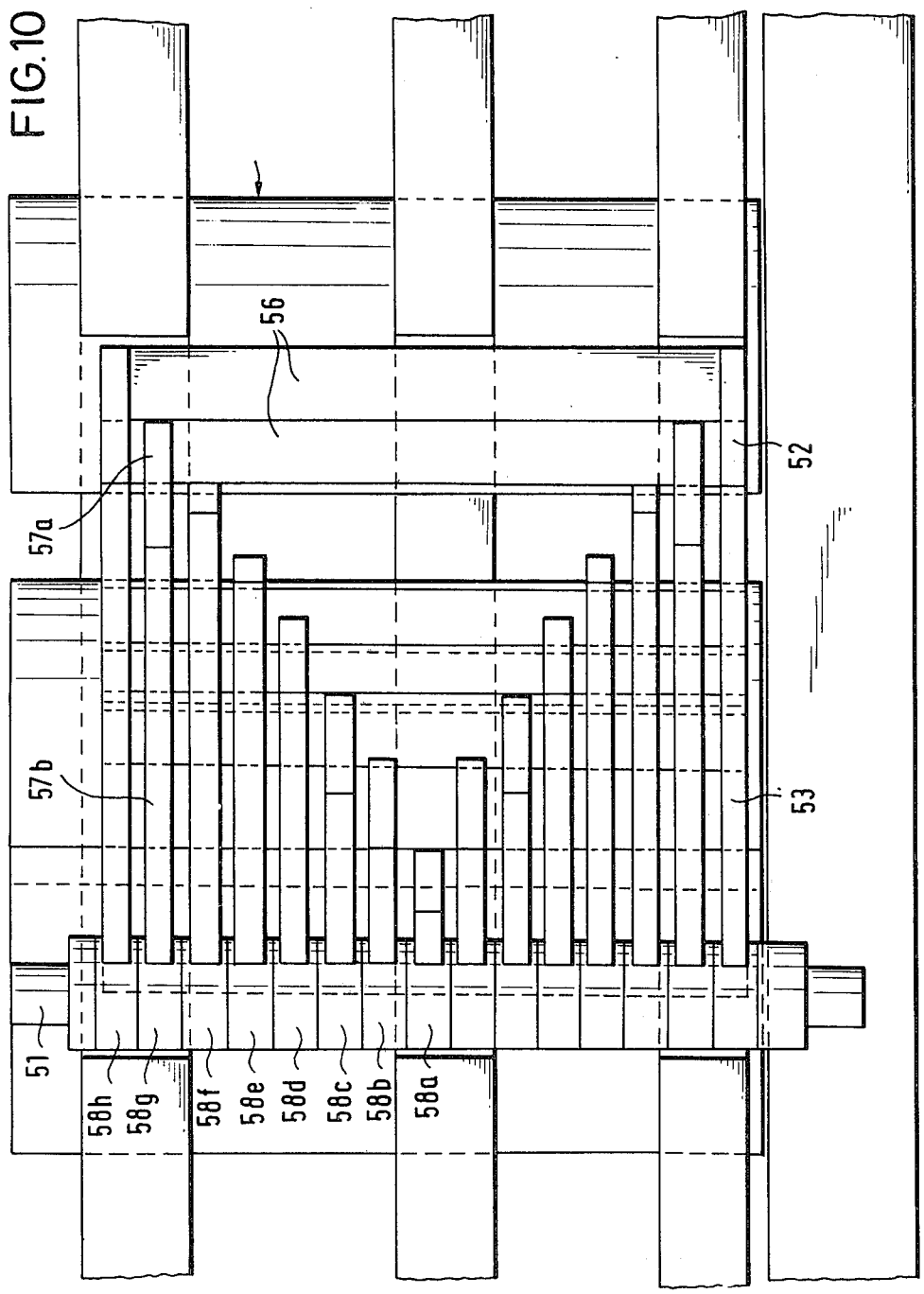

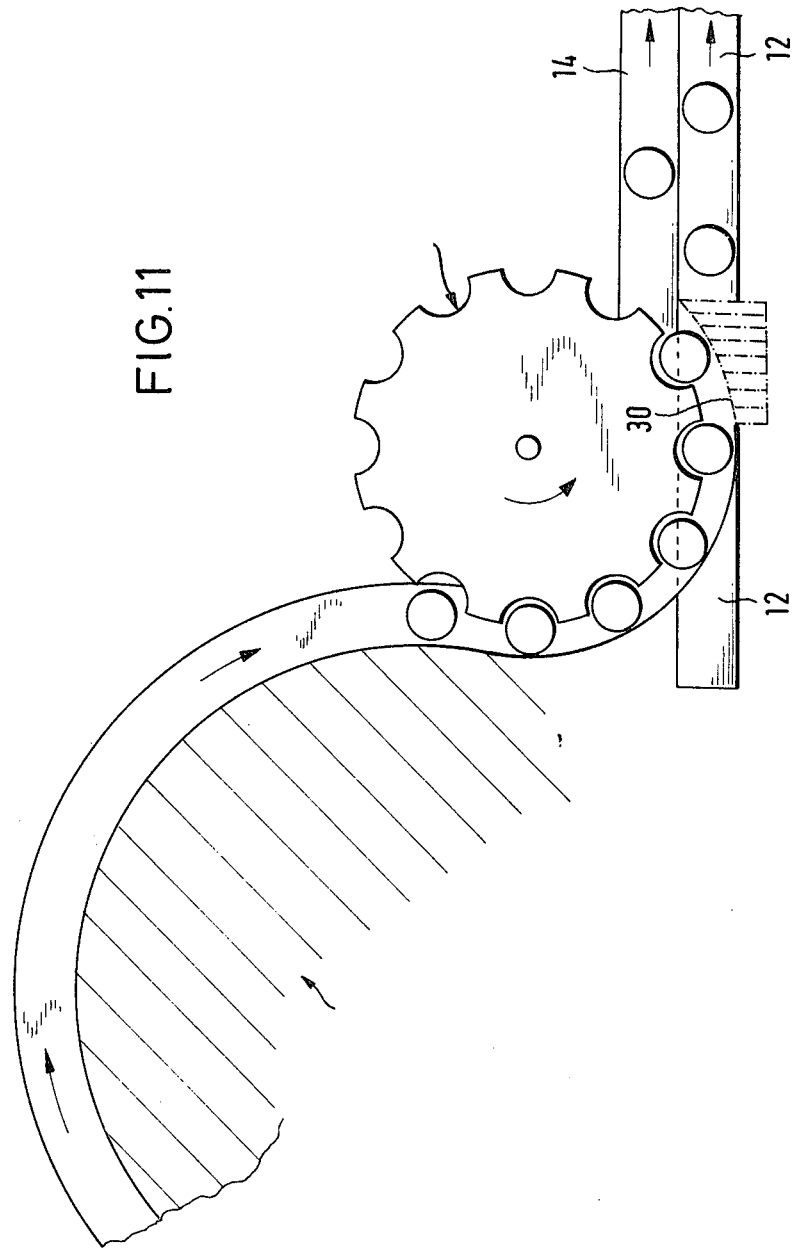

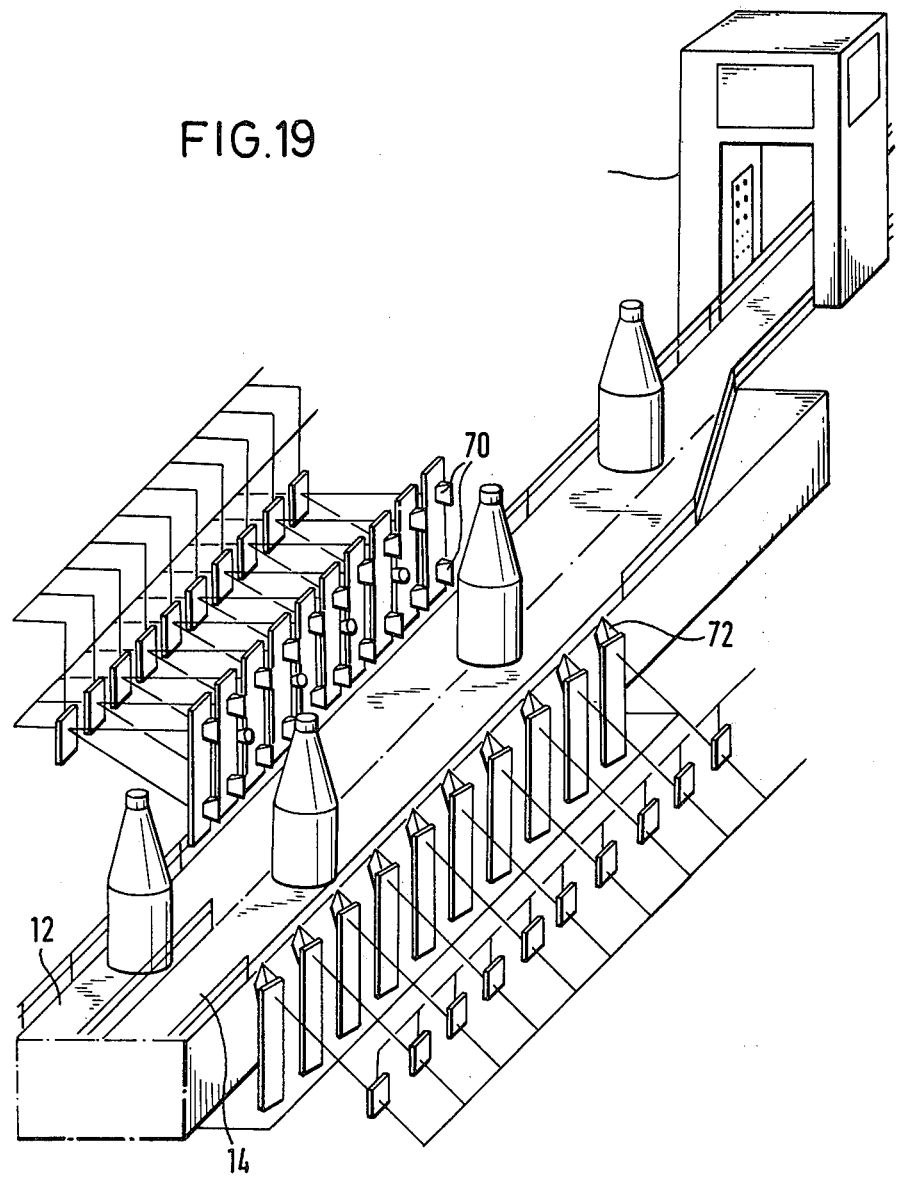

APPARATUS FOR LATERALLY DEFLECTING ARTICLES

BACKGROUND OF THE INVENTION

This invention relates to an apparatus for laterally deflecting articles from a first conveyor means to a second conveyor means. Such apparatuses are, for example, a part of systems for filling liquids into containers, e.g., bottles, and serve to weed out containers that are unfit for sale, e.g., because they are imcompletely filled bottles or improperly closed.

German Patent Application No. 2,358,185 discloses a deflecting apparatus in which the articles, e.g., the bottles, are shifted from a first conveyor means to a second conveyor means by pushers traveling with said first conveyor means. The pushers are guided onto a guide path by a switch by which they are shifted transversely to the direction of conveyance. In order to prevent the articles being sorted from slipping off the pushers, the width of the latter must correspond substantially to the diameter of the articles. The articles to be sorted out must not arrive in close succession; they must be separated by suitable means, i.e., the articles must be spaced apart a certain minimum distance. The apparatus known from the reference therefore automatically requires a relatively large space which complicates, for example, the deflection of the articles to so-called rotary discs. A similar apparatus is disclosed in U.S. Pat. No. 3,361,247.

German Patent Application No. 2,555,192 discloses an apparatus for deflecting articles in which the conveyor means consists of individual narrow belts trained over rolls. The articles are deflected by a comb displaced upwardly (from below) between the belts. This apparatus is usable only in cases where the space between the individual articles is relatively wide, and thus has the same shortcomings as that of the above-mentioned German Patent Application No. 2,358,185.

It is an object of the invention to provide an apparatus for lateral deflection of articles from a first conveyor means to a second conveyor means which operates reliably at high speed even with articles arriving in close spatial and timed succession, and which requires only a limited floor area.

The problem is solved in that the articles to be sorted out are deflected by forming a deflecting face from deflecting segments along which the articles are guided from the first conveyor means to the second conveyor means. The deflecting segments are stationary in the direction of travel, but extensible and retractable in a direction normal thereto in a manner such that at any time only those deflecting segments are extended which are in contact with the article being deflected at a given moment. Hence, the deflecting face is assembled directly in front of the article and is disassembled again directly after passage of said article.

BRIEF INTRODUCTION TO THE DRAWINGS

Examples of the invention will be explained hereinbelow with reference to the drawing, wherein FIG. 1 is a plan view of an apparatus with mechanically operating linearly extensible segments;

FIGS. 7, 8 and 9 show possibilities for the course of light barriers in the case of articles arriving in close succession;

FIG. 10 is a side view of the arrangement of the segments in the apparatus of FIGS. 5 and 6;

FIG. 11 shows the use of the apparatus in connection with a discharge disc;

FIG. 19 is an embodiment similar to that of FIG. 18 in which additional gas nozzles are provided to slow down the deflected articles;

DESCRIPTION OF A PREFERRED EMBODIMENT

Figure 1:
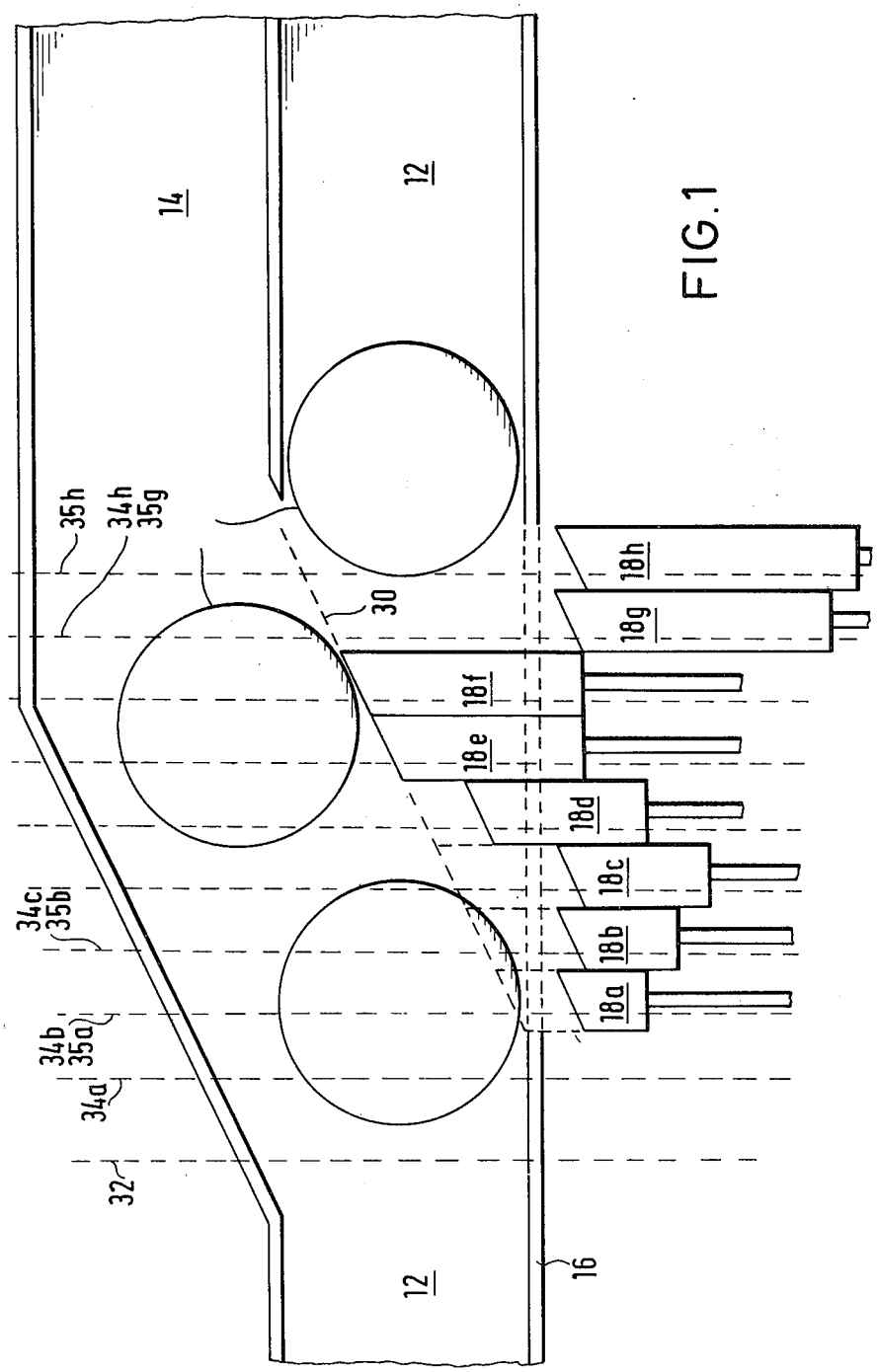

The deflecting apparatus illustrated in FIG. 1 comprises a first conveyor means 12 and a second conveyor means 14 which may consist, for example, of steel or plastic made of an open-link chain. The conveyor means are laterally confined by railings 15, 16 and 17. The second conveyor means extends in parallel and directly adjacent to the first conveyor means. In a certain predetermined region, the so-called deflection zone, the railings are discontinued or continue at an angle in order to guide articles from the first conveyor means to the second conveyor means. In FIG. 1, three articles are shown the intermediate one of which is to be deflected or guided out, while the first and the third articles are to be conveyed on the first conveyor means. The middle article is carried on by the second conveyor means. The deflection of a selected article takes place by segments 18n (n standing for a, b, c, . . . ). The segments are fixedly arranged in the direction of travel of the conveyor means and can be extended substantially perpendicularly with respect to said diredtion.

Since the articles to be deflected are generally slightly slowed in the direction of travel by the deflecting face, so that the distance from the preceding article that is not being deflected is enlarged and the distance from the next following article is reduced, the segments are preferably extended substantially in the direction of the angle bisector of the obtuse angle formed between the deflecting face 30 and the first conveyor means 12.

The segments may consist of a vertical bar 20 and a plurality of horizontal fingers 22. The length of the horizontal fingers 22 is determined preferably by the extended length of the individual segments so that the railing 16 interrupted in the zone of deflection may be replaced by one or more deflecting guide rods 23 which properly guide the articles when the individual segments are retracted. The deflection zone is the region between the first and the last segment. A shaft connects each segment 18 to the piston 25 of a pneumatic cylinder 26. The segment is extended or retracted in response to the position of a magnetic control valve 28.

In the extended condition the working faces of the segments, e.g., the front edges of fingers 22, form a deflecting face 30 by which the selected articles are deflected to the second conveyor means. The segments are extensible to different degrees, and the working faces of the segments are tapered in a direction opposite the direction of travel. In order to deflect an article, the first segment 18a is extended until its working face is flush with railing 16, and then the other segments 18b to 18h are extended until each of their working faces is flush with the working face of the preceding segment. The first segments, e.g., 18a to 18c, preferably have a curved working face so that railing 16 merges into deflecting face 30 in a smooth curve. As a result of this smooth transition, shock-free deflection of the selected articles is possible even at high working speeds.

The width of segments 18n depends on the dimension of the articles in the direction of travel and the spacing between the articles. The width of the segments is preferably less than about one-half or about one-third the distance between the front edges of successive articles. If the articles follow each other directly, the width of the individual segments should not be more than about one-half of the dimension of the articles in the direction of travel. Preferably the segment width is to be less than about one-third of said dimension. The segments need not all be of equal width; thus, for instance, the first segments may have a somewhat greater width. The number of segments depends on the size of the articles and the speed of travel.

Figure 3:
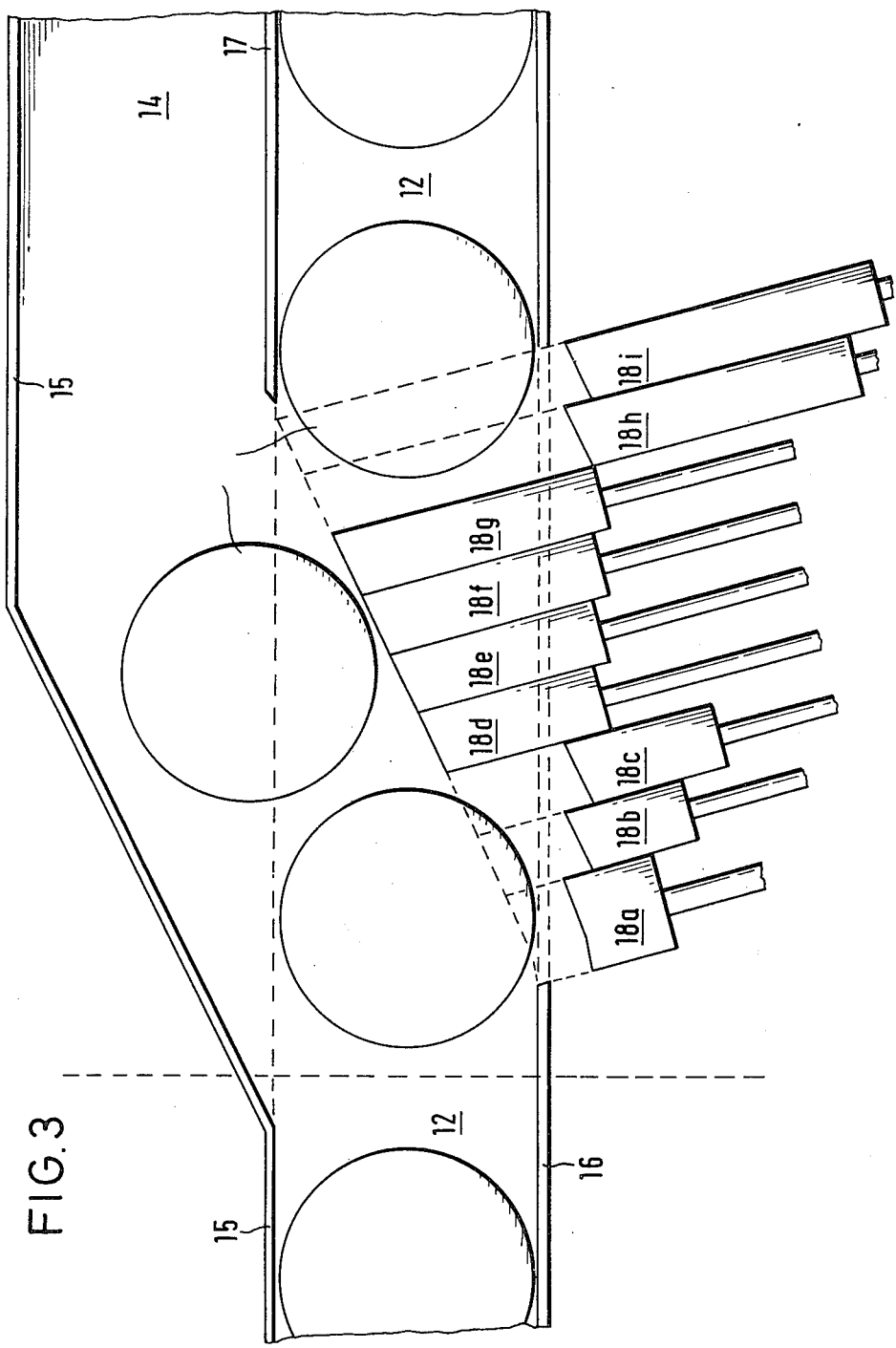
FIG. 3 is a plan view of an apparatus similar to that of FIG. 1 with segments extensible at an angle.
Figure 4:
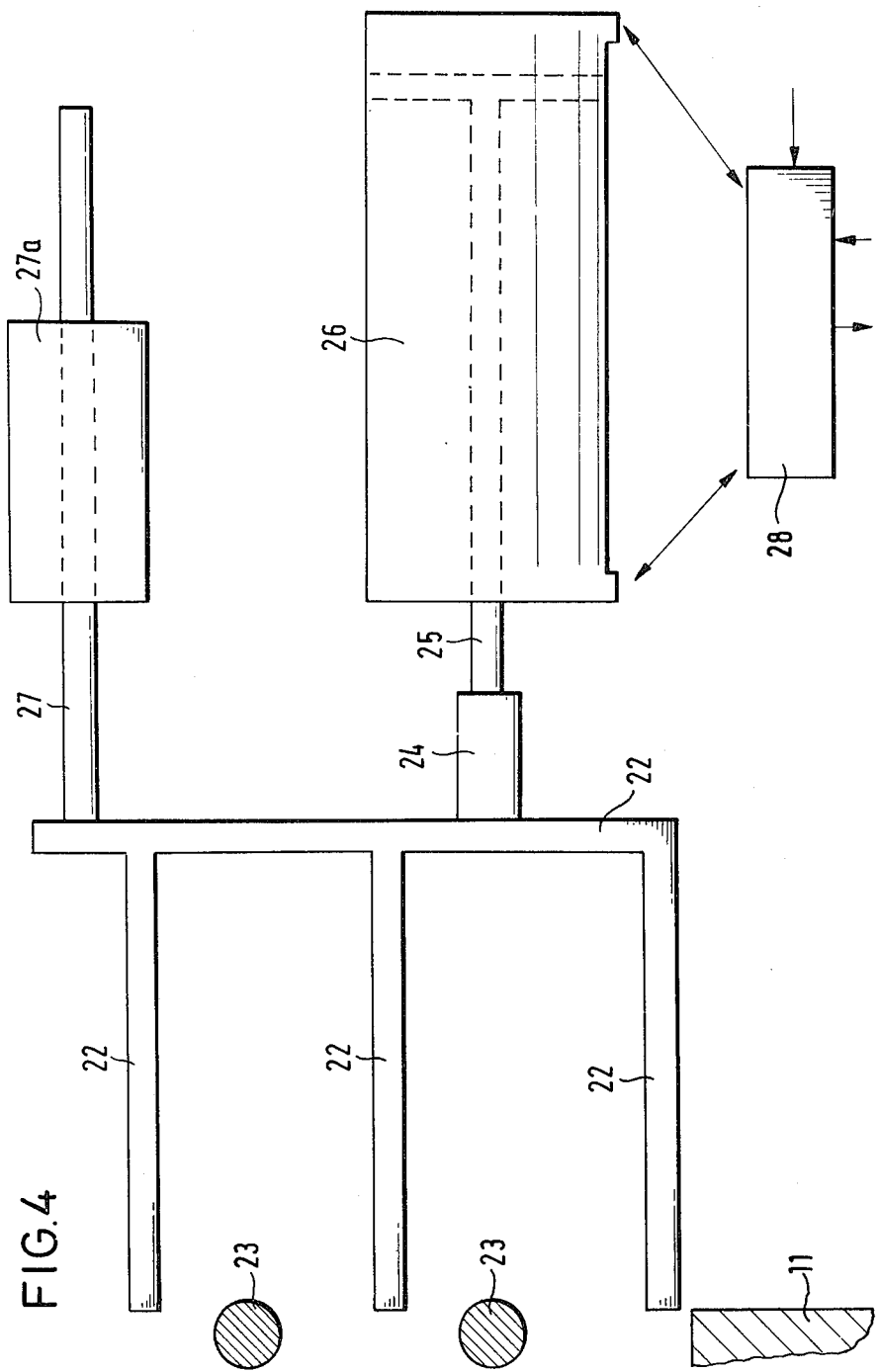
FIG. 4 shows a segment in cross section, seen in the direction of travel.

In the embodiment shown in FIGS. 1, 3 and 4, the segments are moved in the plane on the conveyor means and perpendicular to the direction of travel. However, it is also possible to extend the segments vertically from above. Depending on the type of articles, the segments may have individual fingers 22, or the working face of the segments may be formed by a continuous metal or plastic surface. The angle formed between the deflecting face 30 and the direction of advance of the first conveyor means 12 depends on the rate of conveyance and is the less the higher is the speed of conveyance.

Through fine air nozzles in the working face of the segments, an air cushion may be provided between the articles and the segments. Such an air cushion may reduce friction between the articles and the working faces of the segments and can even accelerate a deflected article in the direction of deflection. Moreover, such air cushions avoid partial overtaking of a deflected article by a succeeding article, because the deflected article is not decelerated.

FIG. 1 only shows a number of segments located at the lower edge of the first conveyor means, as shown in the figure. In order to improve guidance of the articles, obliquely extending railing 15 may be replaced by a number of segments whose working faces extend parallel to the direction of conveyance of the first conveyor means and which are controlled such that they maintain a constant distance from segments 18n corresponding to the width of the first conveyor means. The further segments may be fixedly connected to segments 18n while maintaining said distance. If congestion occurs on the first conveyor means downstream of the deflecting means, such a series of second segments is especially advantageous, as they prevent unintentional diversion of the articles onto the second conveyor means.

In the above-described embodiment the extension of the segments is a purely translational motion.

DESCRIPTION OF FURTHER EMBODIMENTS

Figure 5:
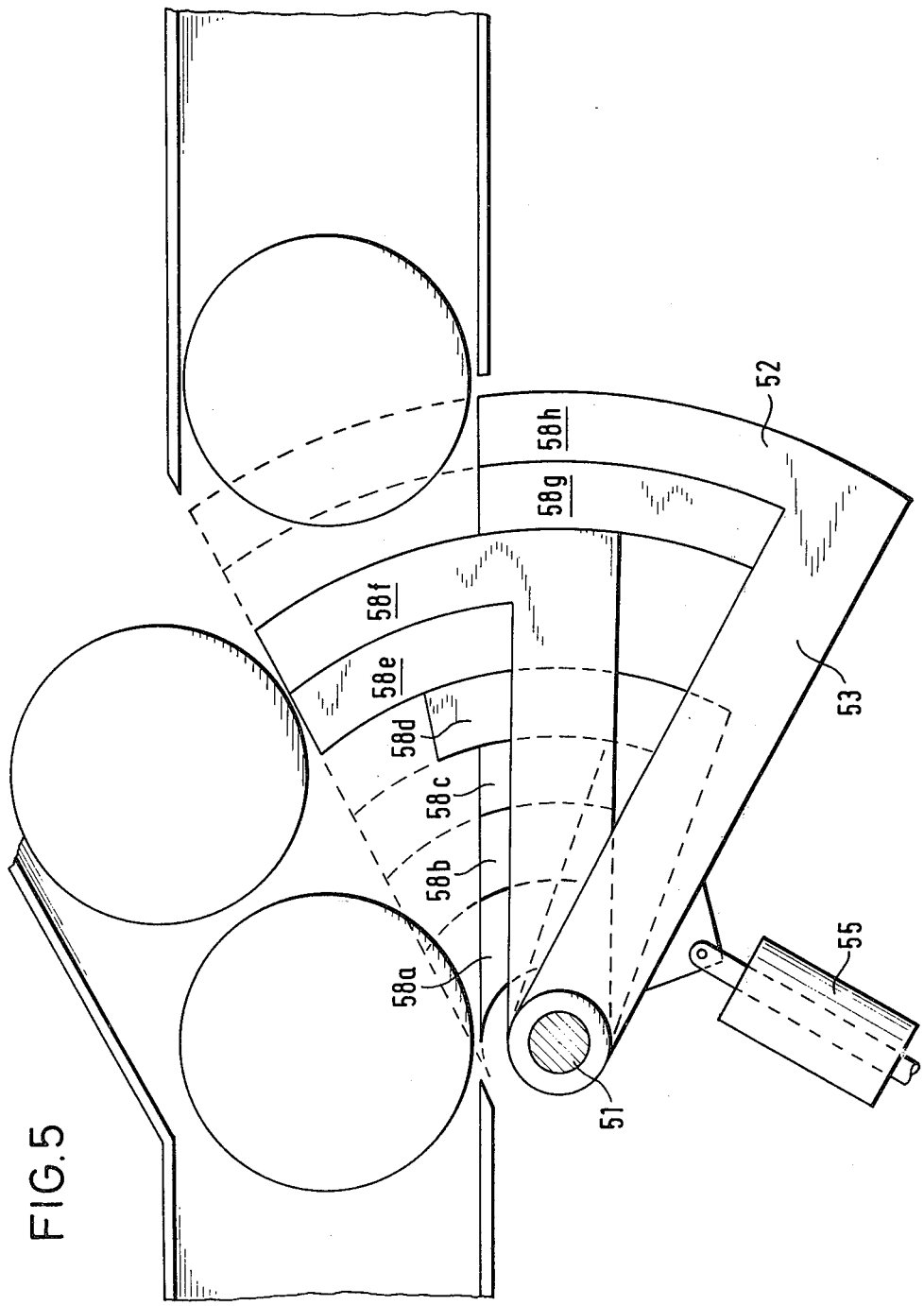
FIG. 5 is a plan view of an apparatus with segments pivotable about a shaft.
Figure 6:
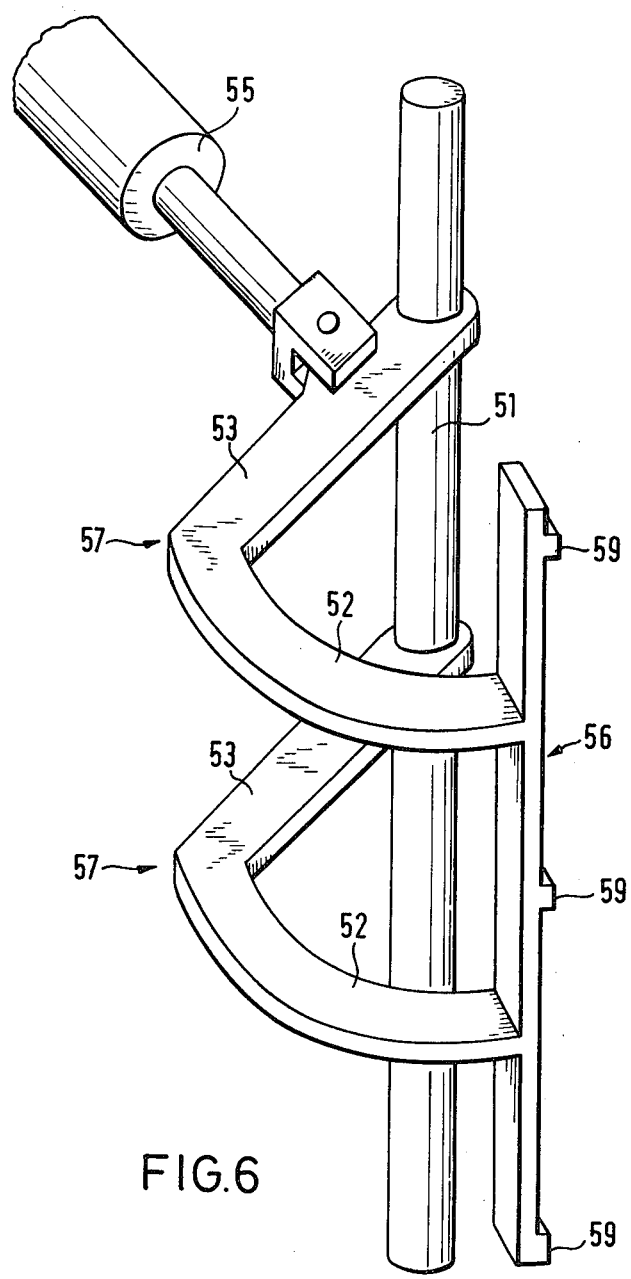
FIG. 6 is a perspective view of a segment of the embodiment shown in FIG. 5.

In an alternative embodiment, the extension of the segments is effected by rotary motion (FIGS. 5, 6 and 10). Segments 58n are individually suspended for rotation about a shaft 51 positioned vertically directly beside the first conveyor means at about the level of the first segment 58a. Each segment is extended by a pneumatic cylinder or by an electromagnet 55, which engages the segments near the axis of roation in order to utilize the lever effect. The segments themselves preferably consist of two angles 57 each having a leg 52 curved concentrically with respect to the center of rotation. These curved legs of the two angles terminate at a perpendicular bar 56 which has one or more elevations on the opposite side (sliding projections 59) along which the articles may slide. Bar and sliding projections form an acute angle with the radius vector to the segment tip such that the retracted segments form a smooth plane in the direction of travel, which then necessarily forms a smooth deflecting plane disposed at any desired angle to the direction of advance as the individual segments are pivoted into operative position. With the straight legs 53 of the two angles, the segments are suspended for free rotation about a stationary shaft 51.

A possible further alternative is an embodiment having an axis of rotation disposed horizontally beside the first conveyor means, as support for suspending the railing segments. This axis of rotation can be located in the plane defined by the surface of the conveyor means as well as above or below said plane; the direction of the axis of rotation may be parallel to the direction of conveyance, or to the deflecting face, or in-between.

The invention resides in the extension at a given time only of those segments which are actually required at that very instant, or immediately thereafter, to deflect the article, i.e., which contact said article, rather than to extend and retract all the segments simultaneously. This permits deflection also in cases where the articles arrive in close succession, with no space between them, without harmful consequences to the articles remaining on the first conveyor means. In FIG. 1, for instance, segments 18a through 18c, which would contact the article shown on the left hand side of FIG. 1, are retracted, as are the segments 18g and 18h, which would contact the article on the right hand side. Only segments 18e and 18f are extended as they are just engaging the middle article which is to be deflected. Segment 18d is just partially retracted.

In the above described embodiments, those segments are extended which engage the selected article at the given moment or immediately thereafter. In a preferred embodiment, all those segments may be extended at any time which do not collide with the immediately preceding and the immediately succeeding article remaining on the first conveyor means. Consequently, the maximum number of segments is in the extended state during a deflection operation.

In order to detect the articles to be deflected, certain criteria of the article, e.g., the level of liquid in bottles or the presence of a bottle closure in the sorting of bottles, are checked mechanically, e.g., by scales or sensing means, or photo-electrically. In the deflecting apparatus illustrated in FIG. 1, checking takes place at check line 32 which is located preferably immediately upstream of the deflection zone. If checking takes place earlier, the result must be delayed in time or stored by suitable means, e.g., by a shift register, in such manner that the result is fed to the segment control means at the instant the respective article enters the deflection zone.

Figure 2:
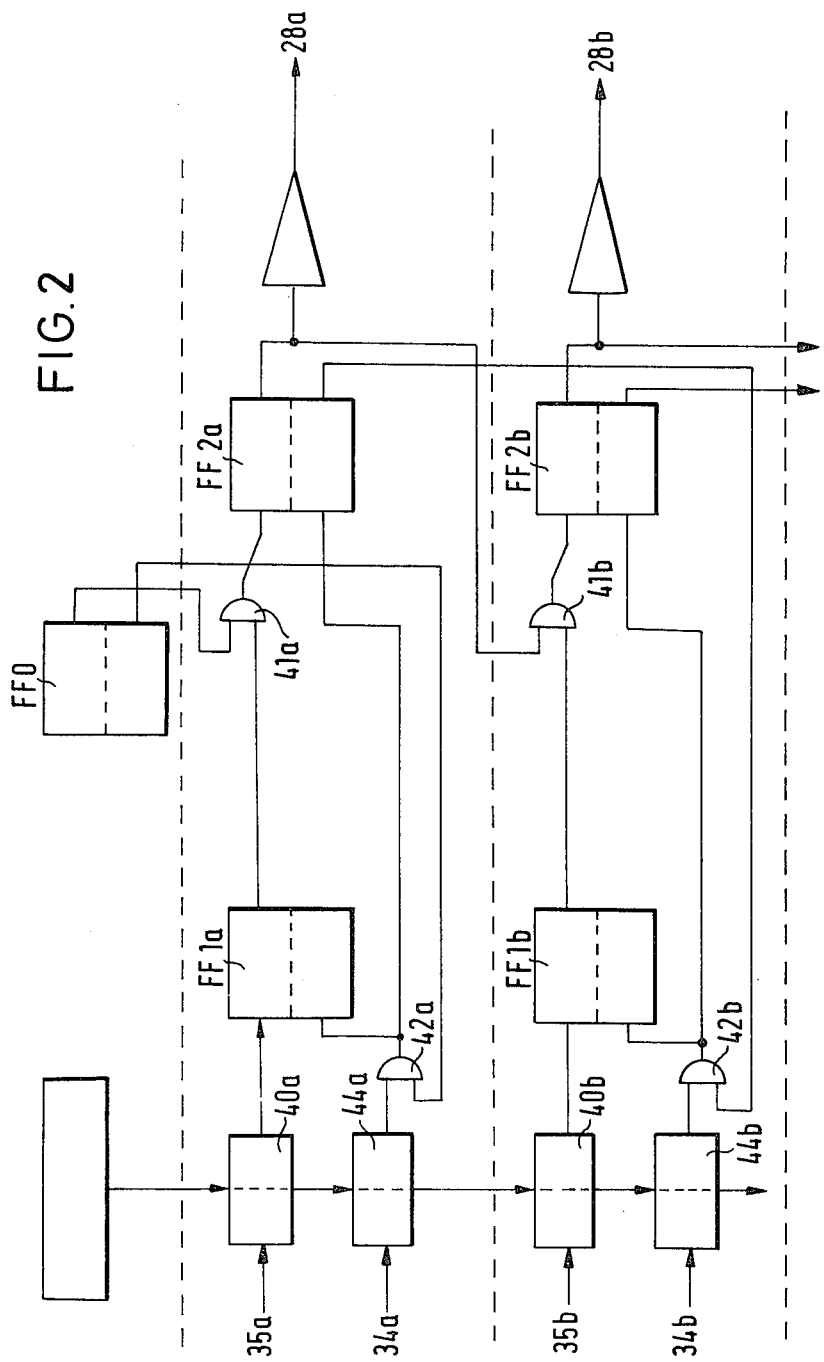
FIG. 2 shows the logic control system for an apparatus as shown in FIG. 1.

The means for controlling the segments in the most simple embodiment thereof, comprises the aforementioned checking means, light barriers 34a through 34h for producing a "retract" command, light barriers 35a through 35h for signalling that the respective segment is free, and electronic control circuitry (FIG. 2). The control system shown in FIGS. 1 and 2 represents the alternative in which at all times the maximum number of segments is extended, i.e., all the segments not colliding with the directly preceding and the directly succeeding article that are not to be deflected. The light barrier 35a signals "free" after passage of the article preceding the article to be deflected. The "free" signal is delayed for a period of time t by a timing element 40a and applied to the set input of the flip-flop 1a. The amount of time delay depends on the speed of the first conveyor means, the period of response of the control means, and the position of the light barrier 35a. The "free" signal is prerequisite for the extension of a segment, and the time delay should be dimensioned such that the article from which the "free" signal is derived is not contacted by the segment extended upon the "free" signal. As mentioned above, the time delay then depends on the speed of the conveyor means. Since the conveyor speed may vary during operation, the delay introduced by the timing element 40a is preferably variable. At low conveyor speed, the time delay is greater than at high conveyor speed. The signal obtained at the normal output terminal flip of flop 1a is applied to the setting input of a flip-flop 2a via an AND gate 41a. The second input of the AND gate 41a is connected to the normal output terminal of a flip-flop 0 which is set by the checking means and which is in the set state, for example, when the article following the article from which the "free" signal is derived is to be deflected as being defective, for instance. The normal output of flip-flop 2a controls, via a power driver, a control valve 28 actuating, for example, a pneumatic cylinder 26 which extends segment 18a. Segment 18a is always extended when an article to be deflected approaches and the directly preceding article has already moved past said segment.

The electronic control circuitry associated with segment 18b is identical with that associated with segment 18a, except that the second input of AND gate 41b is connected to the normal output terminal of flip-flop 2a, rather than to flip-flop 0. Consequently, segment 18b is extended when there is a "free" signal from the light barrier associated with said segment and when segment 18a is extended. The electronic control circuitry of the further segments is analogous to that of segment 18b. Hence, any segment will be extended as soon as there is a "free" signal for said segment and the preceding segment is extended.

Light barriers 34n derive a "retract" command from the leading edge of each article. In addition to a light barrier 35n for the "free" signal, a light barrier 34n for the "retract" command is associated with each segment 18n. The "retract" command is delayed via timing elements 44n. The light barrier 34n for the "retract" signal of a segment is located about one segment width before the light barrier for the "free" signal of the respective segment, if timing elements 40n and 44n with equal time delay are employed. The output of the timing element 44a is connected to one input of an AND gate 42a. The other input of the AND gate 42a is connected to the inverted output of the flip-flop 0. An L-output signal of AND gate 42a resets flip-flop 1a and flip-flop 2a. As a result of resetting flip-flop 2a, a 0 signal arrives at the power driver of the segment 18a to thereby retract said segment. Consequently, segment 18a is retracted when an article interrupts the "retract" command light barrier 34 and flip-flop 0 is reset. These conditions are fulfilled—after deflection of an article—for the first time for the next succeeding article which is not to be deflected. AND gate 42a has a dual task, namely, (a) it prevents unnecessary retraction of the segments if two successive articles are to be deflected, and (b) it prevents retraction of a segment upon the "retract" command derived from an article to be deflectee before said article has moved past said segment.

Segment 18b is retracted when the respective "retract" command light barrier 34b is interrupted by an article and the preceding segment 18a is retracted, i.e., flip-flop 2a is reset. Segments 18c through 18h are retracted under analogous conditions. In practice the control means operates such that the last perfect article releases a "free" signal for the first five segments 18a through 18e, for instance. If the check means then detects a defective article, flip-flop 0 is set and substantially simultaneously the first five segments are extended. Segments 18f, 18g, etc. are extended only after they, too, have been signalled "free," i.e., the "free" command light barriers 35f, 35g, etc. are no longer interrupted by the last perfect article.

For the sake of simplicity, the preceding discussion assumes that light barriers 34a through 34h and 35a through 35h are located at the lines indicated in FIG. 1. In case of bottles, for example, which are sensed at the bottle neck, the broken lines designated 34a through 34h and 35a through 35h do not indicated the actual scan lines, i.e., the position of the light barriers; they mark the location where the leading edge and trailing edge of the controlling article is positioned at the instant of sensing i.e., the instant of the control pulse generation. For the actual positioning of the light barriers, the conveyor speed and the time of response of the cylinders and valves and the time required for extending and retracting the segments must be considered. Therefore, the light barriers must be arranged a distance upstream of the associated segments that substantially results from the product of the conveyor speed and the total of period of response and period of extension or retraction.

Normally one "free" signalling light barrier (dark-light transition) and one "retract" command light barrier (light-dark transition) are required for each segment. If the period of extension of segment n is in about the same order of magnitude as the retraction period of segment n+1, the "free" signalling light barrier of n and the "retract" command light barrier of n+1 may be combined in a single light barrier, as shown in FIG. 1, from whose output signal the edge corresponding to the light-dark transition becomes the "retract" pulse and the edge corresponding to the dark-light transition becomes the "free" signal pulse by means of differentiation.

If all the extension and retraction periods are of the same order of magnitude, the spaces between the light barriers are about equal to the segment widths (FIG. 1). Thus, for example, an air cylinder with resetting spring requires separate retraction and "free" signalling light barriers while for the double-acting air cylinders preferably used on account of the higher setting rate the arrangement shown in FIG. 1 will suffice.

It is also possible to provide only a single "retract" command light barrier 34 and a single "free" signalling light barrier 35, rather than separate light barriers 34n and 35n for each segment n, at the entrance to the deflection apparatus, e.g., at the position of the above-mentioned light barriers 35a and 34a. The "free" signals and "retract" commands for segments 18b through 18h are then obtained by time delay of the signals derived from the single "free" signalling light barrier and the single "retract" command light barrier corresponding to the rate of advance of the first conveyor means and the spacing of the segments.

To prevent malfunctioning, the position of the sensing systems must be so selected that, with predetermined configuration and predetermined space between the articles, the individual articles can be safely distinguished from one another (resolved) and the trigger pulses ("free" signals, "retract" commands) can be reproduced with a given precision determined substantially by the speed of travel of the articles.

In case of wider spacing (so wide that the successor of an article to be deflected will not overtake the latter during deflection thereof) light barriers beaming in the direction of segment extension can safely produce the required trigger pulses ("free" signals and "retract" commands). In this case it is of no significance that, using the principle of control responsive to preceding and succeeding articles, the article to be deflected also produces trigger pulses, because said pulses are suppressed by the circuit shown in FIG. 2. In the case of smaller spaces between the articles, it is exclusively their configuration that determines the position and direction of the light barriers.

Thus, for instance, bottles will be sensed at the neck level, the direction of the light barriers corresponding substantially to the bisector of the obtuse angle between the deflection face and the first conveyor means. Articles which together do not form a continuous edge 36 extending in the direction of travel, e.g., cylindrical articles such as cans, can be sensed by light barriers (FIG. 7) extending obliquely upwardly or downwardly. Articles which together do not form a continuous uninterrupted surface can be sensed by means of suitable reflective light barriers from above or from the deflection side (FIG. 8).

The principle of control responsive to preceding and succeeding articles permits an especially favorable arrangement of the light barriers shown in FIG. 9. Light barrier emitters 93b through 93h and 94a through 94g are integrated in fingers 22. The emitters may be infrared light diodes, for instance, or they may be light conductors leading to stationary light barrier units.

The beaming directions of light barrier emitters 93b through 93h giving the "retract" commands extend from the emitters in the individual segments preferably in parallel to the deflection face to a first light barrier receiver block 91. The beaming directions of the "free" signalling light barriers extend from emitters 94a through 94g in the segments to a second light barrier receiver block 92. The coordination of the light barriers is so selected that each one of segments 18b through 18h is automatically retracted upon receipt of a signal from its retract light barrier upon the approach of an article which is not to be deflected, and each one of segments 18a through 18g signals "free" or extends the next following segment in response to the preceding article.

In this case the first segment 18a is controlled by the check light barrier (check line 32). The position of emitter and receiver may also be interchanged so that blocks 91 and 92 are emitters and the receivers are accommodated in the segments.

Moreover, the course of the individual articles may be supervised by inductive or capacitive proximity switches, ultrasonic barriers, air barriers etc. or with video (CCD) cameras.

Such cameras are used not only with articles which are difficult to resolve but also with deflecting appratuses which must handle different embodiments of given articles in alternating operation (e.g., liquid level and closure supervision in beverage filling systems adjustable to a plurality of types of bottles).

The advantages of the above described control methods reside in the fact that the segments are extended at the earliest possible instant and are no longer in motion at the instant the article to be deflected contacts a segment. This prevents the articles from being pushed over by the moving segments. The fact that it is the next succeeding article which gives the command for retraction of the segments assures that, on the one hand, in the case of more widely spaced articles, an article is deflected by the deflection face formed by the segments and, in the case of narrowly spaced articles in close succession, even the last segments are reliably retracted so that they will not obstruct the advance of the articles. Since the speed of travel of an article may be slowed during deflection, it is possible that the last segments are already being retracted before the article is completely deflected to the second conveyor means, because the next following article commences to overtake the deflected article, and therefore the "retract" command is given apparently prematurely by the overtaking article. However, the next following overtaking article will then automatically act as a support and push its predecessor completely from the first to the second conveyor means.

It is an additional advantage that, in the case of a plurality of articles deflected in direct succession, the segments are extended only once, notwithstanding the spacing between said articles, and are retracted again upon the approach of the next succeeding article which is not to be deflected. If the "free" signalling and the "retract" command were derived from an article itself, rathern than from the preceding and the succeeding articles, the segments in the aforementioned case would be extended and retracted for each individual article.

Moreover, the independence of the control from the article to be deflected is advantageous also because the control is thus independent of the configuration and the position of an article. On the other hand, if the control is derived from the article to be deflected, the detection of different types of articles by light barriers becomes difficult or even impossible. The control of the segments in response to the preceding and the succeeding articles permits, for example, the sorting out of a series of cylindrical bottles of a different configuration, e.g., bottles with a quadrangular cross section, or overturned bottles, or even bottle bases and quite generally broken bottles and glass fragments. This is not possible with known deflection systems.

The rate of operation of the above described embodiments of the deflection apparatus of the invention is limited by the inertia of the control valves 28 and of the pneumatic cylinders 26. The time required from the application of the signal to the occupation of the desired final position (retracted—extended) of a pneumatic cylinder can be subdivided into substantially three phases:

(1) switching period of control valve 28;
(2) time required by the cylinder 26 to reach the initial break-away pressure and by the piston 25 to overcome the static friction, i.e., until the piston rod starts moving (break-away period);
(3) time of movement of the piston rod (period of motion).

While the switching period of the control valve is relatively constant, the initial break-away period and the period of motion must have the benefit of a safety margin because a piston which is actuated only irregularly is slower than one which operates continuously, and, when at rest, the piston seal commences, after a few seconds, to adhere to the setting oil and grease film covering the cylinder walls. Hence, in most cases a substantially greater force (pressure on the piston) is required to start the piston rod than to keep it in motion.

With a double-acting cylinder 26, a substantial reduction of the initial break-away period, namely to less than 50%, is achieved by assisting the application of the energy required for starting the piston rod by a spring 29 (FIGS. 14 and 15), rather than by applying it exclusively by the pressurized air (break-away pressure), the required energy being stored in said spring as potential energy applied by the preceding stroke in the other direction.

Figure 14:
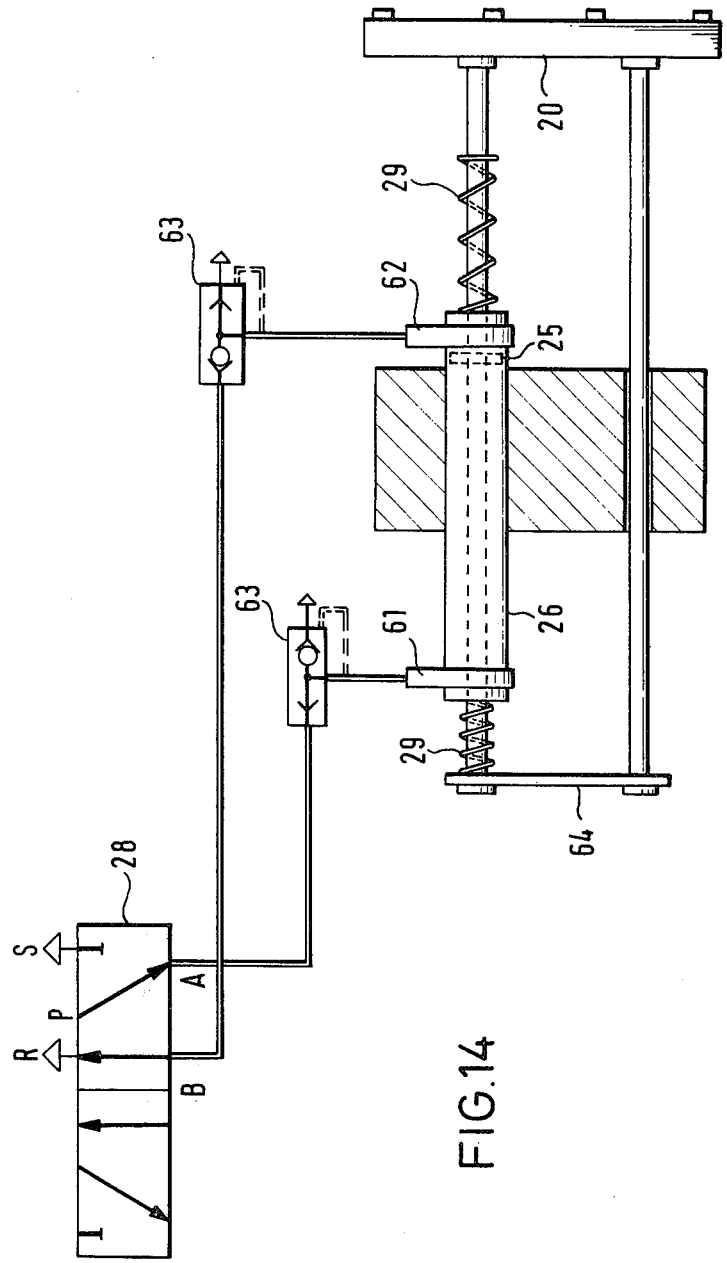
FIGS. 14 and 15 show an embodiment in which the extension and retraction of the segments is aided by compression springs.
Figure 15:
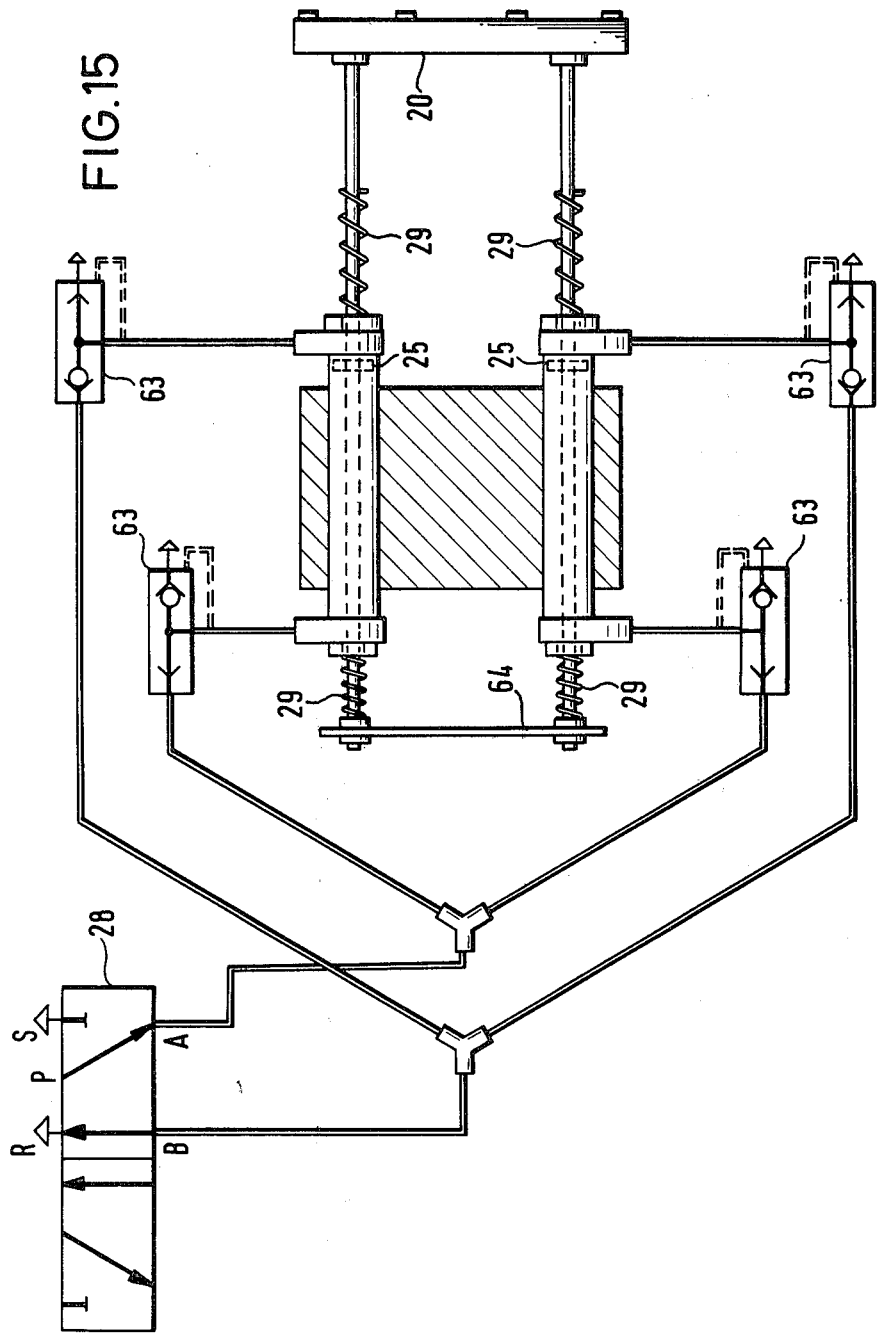
Figure 16:
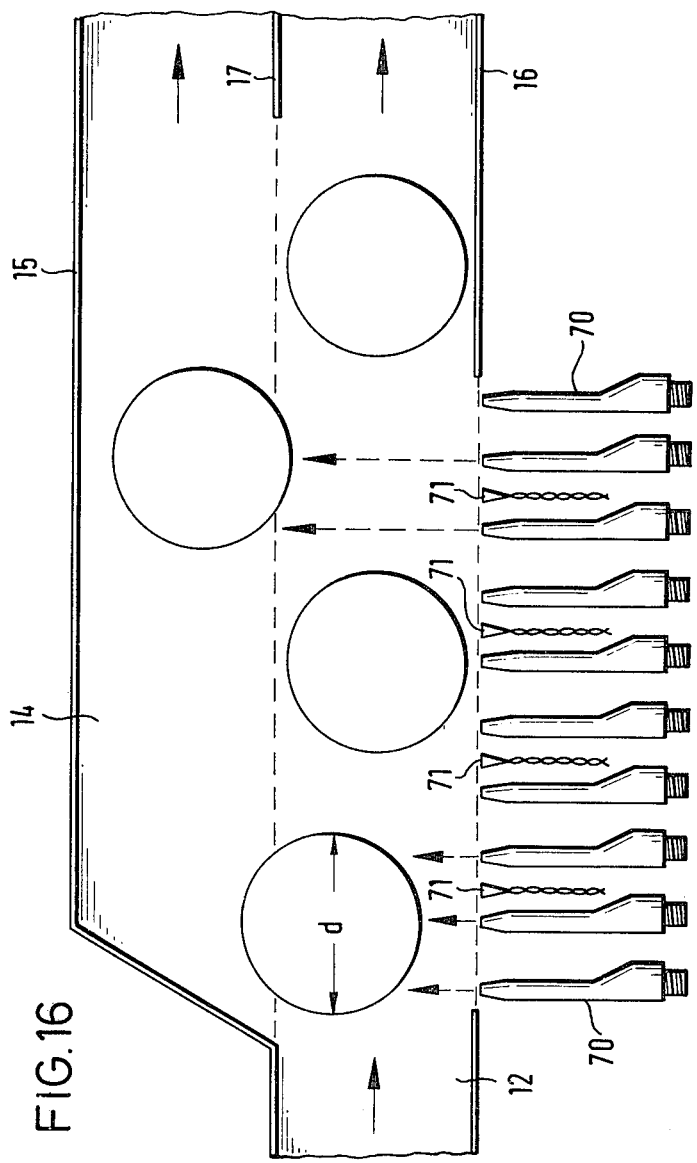
FIGS. 16, 17 and 18 show a deflecting apparatus in which the deflecting means are gas nozzles.
Figure 17:
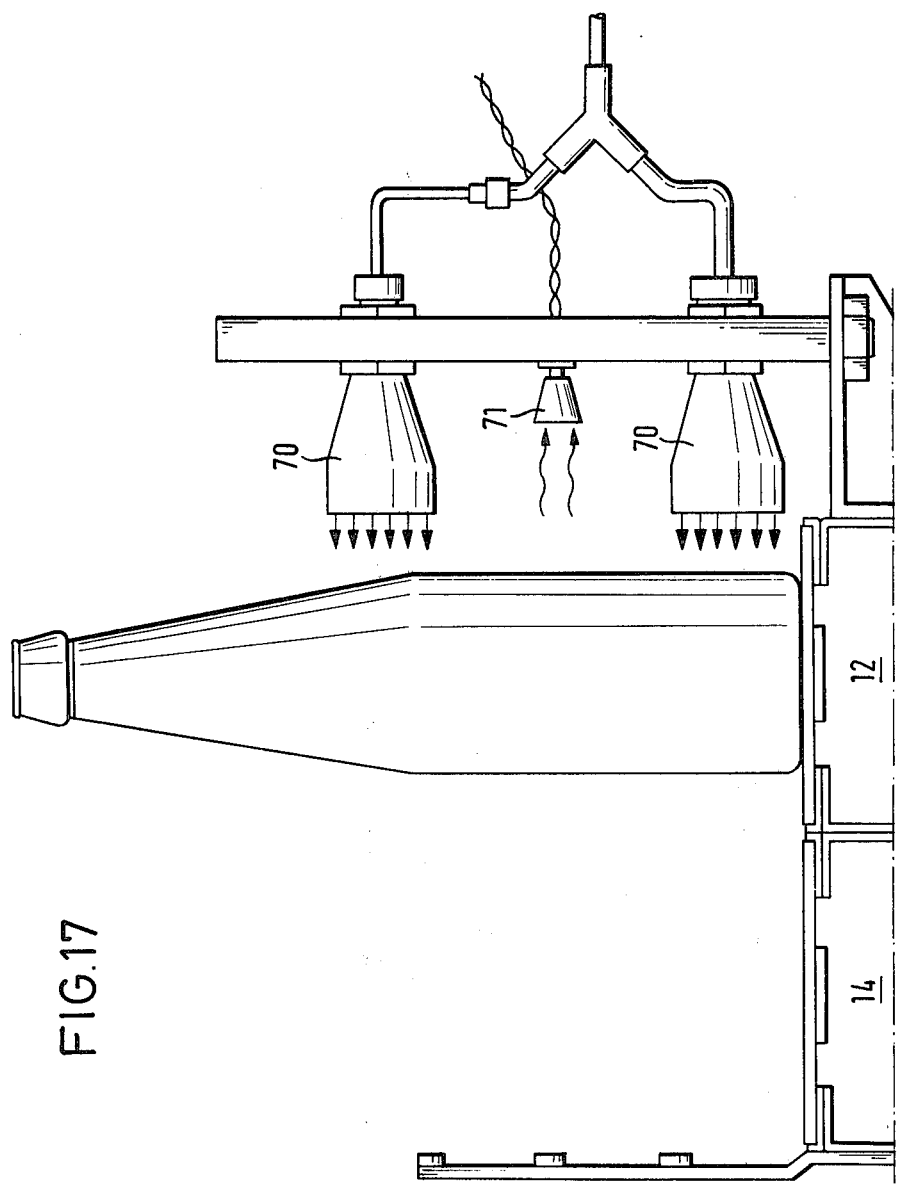
Figure 18:
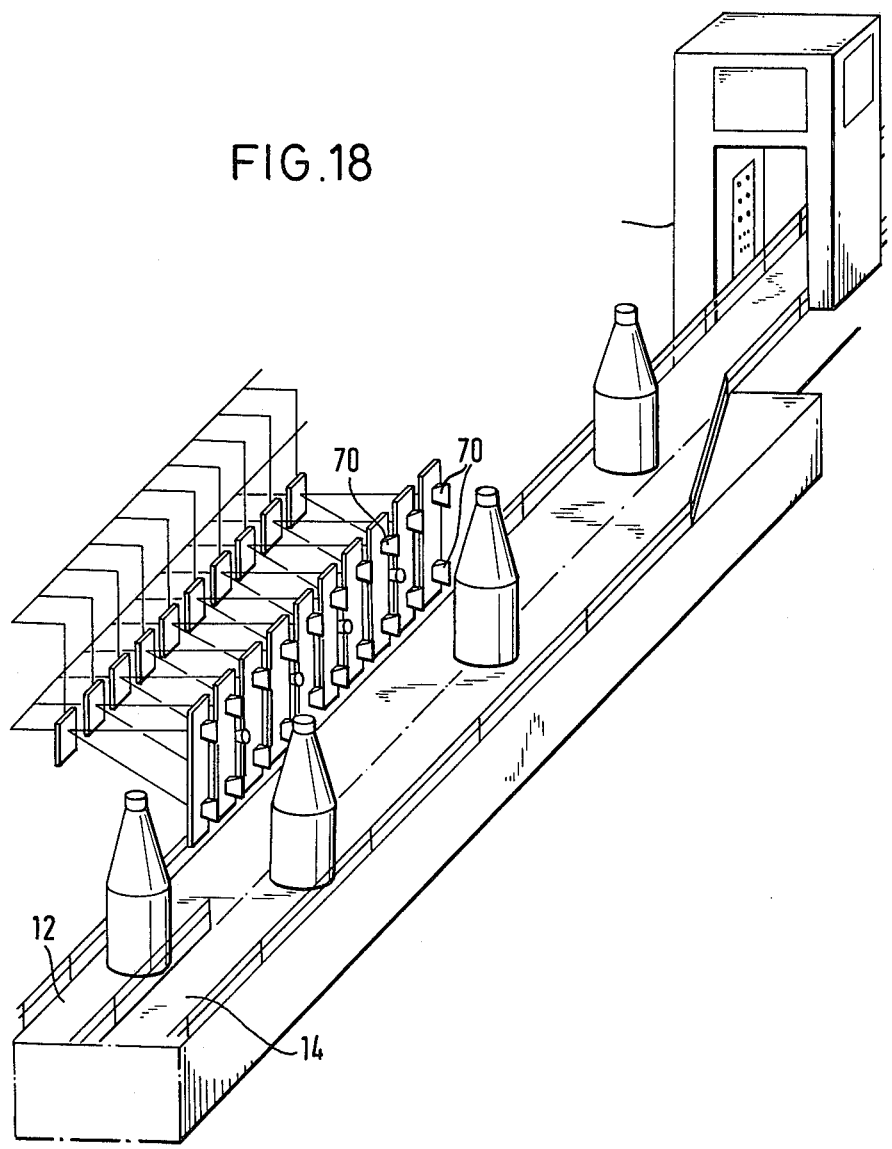

To this end, the piston rod of each double-acting cylinder 26 of the segments carries a helical compression spring on each cylinder end. The spring paths are short relative to the stroke length of the piston, e.g., half as long, and their forces are so dimensioned and abutments are so arranged in spaced relation to the piston, that the springs are compressed in the end positions between about 2 and 15 mm (depending on the stroke length) until an equilibrium of forces is reached. In FIG. 14, yoke 64 and bar 20 form the abutments. The final position of the piston is thus the position in which the spring force is equal to the piston force produced by the pressure. The springs may also be arranged within the cylinder or designed as leaf springs.

Normally springs having a constant spring characteristic may be employed. However, in case a portion of the kinetic energy is very high, or only minimal overshooting in the end position is desired, springs having an exponential or progressive characteristic or a plurality of concentrically arranged springs of different characteristics must be employed.

In the above described cylinder, it is assumed that one conduit 61 is supplied with pressurized air, i.e., the railing segment is extended (FIG. 14) and the left hand spring is compressed. Now, if the control circuit switches control valve 28, so that after the time delay caused by the switching period of control valve 28 the other conduit 62 is charged with pressurized air and the one conduit 61 is discharged, the piston rod will immediately move to the left because the force of the compressed spring 29, which is equal to the force of the piston, is sufficient by itself to overcome the static friction of the piston and to expel the air in the opposite cylinder chamber through rapid venting valve 63 and the control valve 28. The force of the mounting air pressure is added to the spring force, so that the piston is accelerated along the first millimeter of the stroke length with a force substantially greater than the actual thrust force of the cylinder. After leaving the spring region, the piston is normally accelerated by the force of the air pressure until it reaches the oppositely disposed spring, which now acts as a final position attenuation, thereby storing the energy required for the return stroke.

The provision of springs 29 offers an advantage additional to the reduction of the initial break-away period: When two parallel cylinders whose piston rods are connected by a yoke 64 (FIG. 15) are used for a single segment, sychronization problems normally arise, due to different starting periods which result in the cocking of piston 25 and the early destruction of the piston rod bearings. However, if the static friction is overcome by springs 29, the initial break-away periods of the two pistons interconnected by yoke 64 are substantially equal, so that cocking does not occur. The only remaining synchronization problems are due to the difference in the friction coefficients of the two cylinders. These occurring forces can easily be compensated through yoke 64 and bar 20.

FIGS. 16 to 19 show an embodiment in which the deflecting means are stationary air nozzles 70 arranged in railing 16. The intensity of the air jets produced by these air nozzles may be graded and may increase in the direction of travel. The intensity of air nozzles 70 is so adjusted that an article to be deflected is shifted stepwise from the first conveyor means 12 to the second conveyor means 14. In order to avoid unnecessary consumption of pressurized air when the articles are more widely spaced, nozzles 70 are suitably controlled i.e., turned on and off by the article which is being deflected. In lieu of air, any other suitable fluid may be employed. The stationary air nozzles 70 produce an air cushion which, in principle, behaves in exactly the same way as the above described deflecting face 30 along which the article may slide.

The advantages offered by deflection means in the form of air nozzles are a higher operating rate (no inert masses have to be moved) and diminished wear of the deflection apparatus.

However, special problems arise in this connection. Assuming that ten air nozzles 70 spaced 3 cm apart are required to produce the air cushion, and the intensity is so adjusted that, at maximum speed of travel and with maximum friction, the articles of maximum weight are just being still deflected. With this adjustment, for example, the blow force of the first five nozzles would already be sufficient to deflect a relatively light-weight article; the other five nozzles would then force the already deflected article against the outward railing of the second conveyor means 14, so that a less stable article (e.g., a bottle) may tip over. Moreover, the article could reach an excessively high speed and be damaged when hitting the external railing of the second conveyor means. This problem is obviated by an air nozzle control means which will now be described.

A detector detects the speed component perpendicular to the conveyor means and/or the distance from the air nozzles 70 of the article being deflected. On the basis of this information, the air nozzle control means can restrict the number of blowing nozzles so as to assure optimum deflection to the second conveyor means.

In the aforementioned example it is sufficient, for instance, if only the first four nozzles 70 are blowing and the sequence is then interrupted, because at about the level of the fourth nozzle the paraboloid deflection curve of the article is already rather steep (i.e., the speed component perpendicular to the first conveyor means is high), and this indicates that the article will now move onto the second conveyor means by itself, without the application of external force, solely by virtue of its inertia.

The frictional resistance between article and conveyor means again reduces the speed perpendicularly with respect to the conveyor means, so that, by suitable selection of the moment of switch-off, even contact with the outer railing of the second conveyor means may be avoided.

The steepness of the deflection curve depends on the mass of the articles, the speed of travel, the friction, and the intensity grading of the nozzles. This grading of the intensities and the intensities themselves are so selected that with unstable articles a flat deflection curve will result.

Alternatively, all the nozzles may blow with equal intensity. This embodiment obviates the throttling valves before a number of the nozzles. The first nozzles may blow with high intensity in order to overcome the static friction between the article to be deflected and the conveyor means and to accelerate it perpendicular to the direction of travel, while the succeeding nozzles operate at less intensity and only balance the sliding friction of the article. This will result in a flat deflection curve and is therefore advantageous in use with unstable articles. Furthermore, it is possible to slowly increase the intensities of the last nozzles because the force applied to the deflected article decreases with increasing distance thereof from the nozzle. In addition, the last nozzles may blow with reduced intensity in order to assure slow-down by increasing the influence of the sliding friction.

Unstable articles of relatively great height (e.g., bottles) may be deflected by means of a plurality of superposed tiers of nozzles, rather than with a single row of nozzles which applies the thrust forces at the centers of gravity of the articles. The individual deflecting means would then consist of a plurality of superposed nozzles. The nozzles of one deflecting means need not blow with equal intensity.

The risk of toppling the articles being deflected may be reduced, for example, by operating the lower nozzles at higher intensity (point of attack of the greatest deflecting force, about equal to the point of attack of the greatest counteracting force).

The angle relative to the conveyor means at which the nozzles blow depends not only on the density of article succession and the stability characteristics, but also on the relative speed of the second conveyor means or on whether during deflection the speed is accelerated or decelerated or remains constant. When the second conveyor means travels at a slower speed than the first one, for example, air nozzles 70 can simultaneously decelerate the articles being deflected by blowing somewhat against the direction of advance. The air nozzles need not all blow at equal angles with respect to the direction of travel. In order to decelerate the articles being deflected, the last nozzles may, for example, be inclined against the direction of travel to an increasing extent.

The spacing in the direction of travel of the individual deflecting means depends on the diameter of the articles to be deflected and on the desired shape of the air cushion. With a given diameter (d) of the articles to be classified, a nozzle distance of less than d will produce a continuous air cushion along which an article will be smoothly deflected, because at any time the blow jet of at least one nozzle impinges against the article. With a nozzle spacing $\geq d$ the continuous air cushion will increasingly disintegrate into individual air blasts (air cushion in front of each individual nozzle). The smooth deflection will change into step-wise shifting towards the second conveyor means, and each nozzle must newly overcome the static friction of the article being deflected if the article comes to a stand-still on the first conveyor between the individual deflecting means. Preferably the spacing between the nozzles 70 is less than the diameter of the articles.

If a plurality of second conveyor means is used in lieu of a single second conveyor means 14, multi-channel deflection may be achieved. Depending on the deflecting means where the nozzle is not switched on, the article will be deflected to a predetermined one of the second conveyor means.

The signals delivered by the detector may also affect the mode of operation of the nozzle in another way:

In the embodiment just described, the nozzles of all suceeding deflecting means are inactivated or are not activated as the article moves past a predetermined point on the deflection curve.

It is also possible to supervise the entire configuration of the deflection curve by means of the measurement data delivered by the detector. The detector delivers data concerning the extent of the already performed deflection. A microprocessor utilized for the control concurrently analyzes said data and so controls the air cushion switch that all the articles, regardless of their weight and speed of travel, describe the same deflection curve, which is preferably as flat as possible. When, for example, it indicates that a light-weight article is deflected along a curve that is too steep, the air nozzle control means will react by reducing the intensity or the active period of the nozzles.

In order to reproduce the same deflection curve, the detector in the deflection zone must furnish as many and as precise a number of spacing data, and possibly a plurality of valves with pressure reduction means must be provided for each nozzle, or the active period of the nozzles must be shortened.

The detector must furnish not only spacing and/or speed data, but also an additional signal or data indicating the position of the measurement point in the direction of travel. This permits the unequivocal coordination of a measurement datum to an article to be deflected, and in this way the control program of the microprocessor (or of the electronic control circuit) may discontinue the blow sequence pertaining to one article, while another article continues to be deflected. Such detector means can be realized with a plurality of optical angle sensors, reflection sensors, and inductive and capacitive pick-ups, light or ultrasonic delay time measuring instruments, one or more CCD cameras or video cameras, etc.

Preferably ultrasonic transducers 71 are used as detector.

The impingement of a pressurized air jet against the surface of an article to be deflected produces sound, mainly in the ultrasonic range. Due to resonance phenomena, certain sonic frequencies are clearly distinguishable against the background noise. Amplitude and level of these frequencies depend on the intensity of the impinging air jet which, in turn, depends on the distance of the article from the nozzles and on the speed of travel of the article perpendicular to the direction of travel (Doppler effect).

By means of the ultrasonic transducer 71 these frequencies can be picked up and by means of an evaluating electronic circuit the desired information about travel speed and distance can be obtained. The distance can be determined by simple evaluation of the amplitude or by delay measurement of the acoustic frequency mixture generated during the deflection. Thus, for instance, the time difference between the beginning of the so-called white noise (caused by the blowing nozzle) or between the occurrence of a predetermined frequency generated by the pressurized air as an article moves past the nozzle opening, and the arrival of the sound generated on the article surface or reflected thereby, can be measured; the measured time difference results from the delay times determined from the distance "article-nozzle", namely from the time of the exit of pressurized air until the impingement on the surface plus the time for the sound to travel from the surface to the ultrasonic transducer, or from the time for the sound to travel from the nozzle to the surface and back to the transducer, and from a few constant time delays and factors (time of sound to travel from the nozzle to the transducer, pressure).

There is a further alternative for controlling the deflection curve:

If the configuration and primarily the weight of each article to be deflected are known—an instrument (e.g. scales) upstream of the zone of deflection can determine the weight—the air nozzle control means may control the deflection on the basis of previously programmed experience data, which obviates the use of the above described detector.

Figure 23:
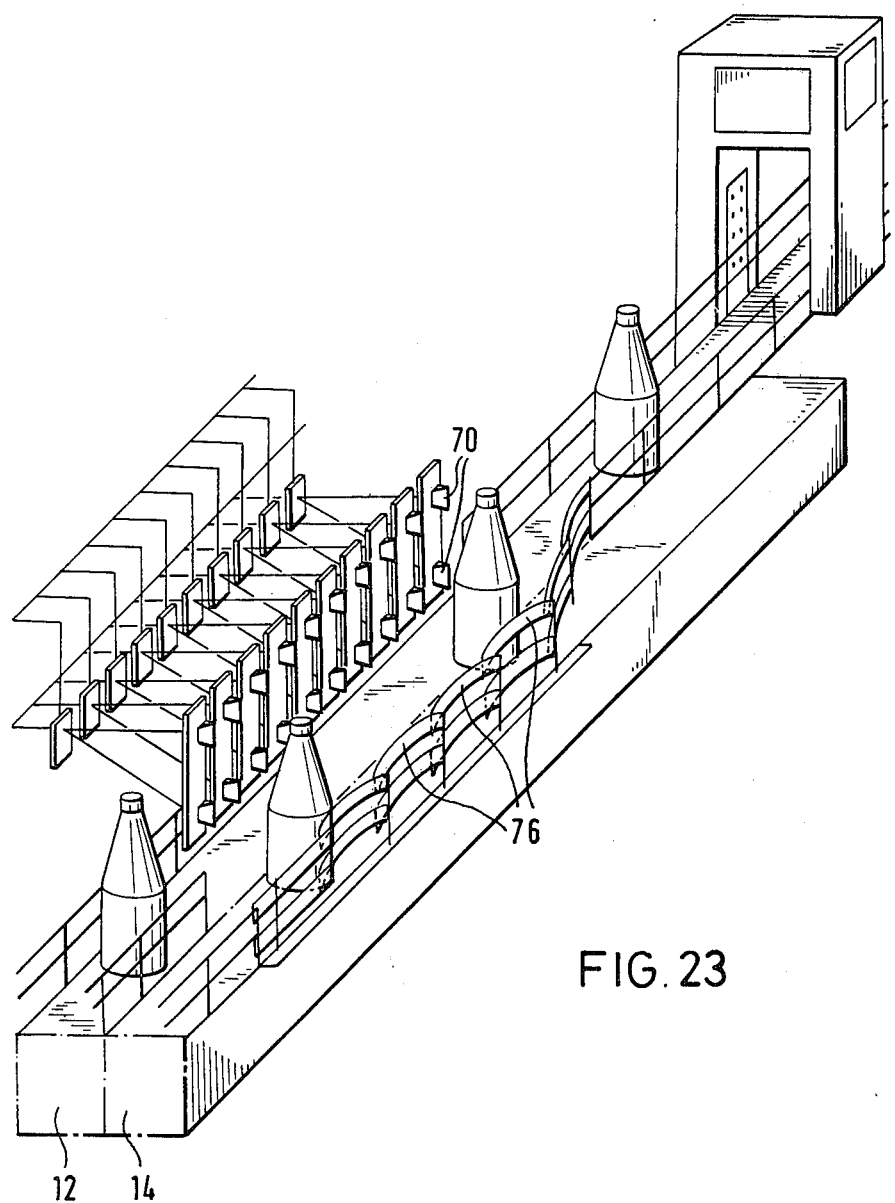
FIG. 23 shows an embodiment similar to that of FIG. 19 providing damping strips in lieu of stabilizer nozzles.

In the case of unstable articles, there is the risk that they will topple over the nozzles are deactivated and the articles are abruptly slowed down due to friction. This may be prevented, for example, by a high opposite railing with damping strips 76 (FIG. 23). Preferably, one or more stabilizing nozzles 72 are provided obliquely in the direction of travel opposite the deflecting means and at a level above the center of gravity of the articles to be deflected to blow counter to the direction of deflection, to thereby stabilize the articles being deflected. It may be advantageous to direct stabilizing nozzles 72 obliquely upwardly in order to minimize noxious turbulence. These stabilizer nozzles are so triggered that they start to operate immediately after the last deflecting means which was switched on or activated. Like the deflecting means in the form of segments, the stabilizer nozzles may also be switched on successively in response to the advancing motion of the article.

The arrangement of the stabilizer nozzles depends on the type of the second conveyor means.

Figure 21:
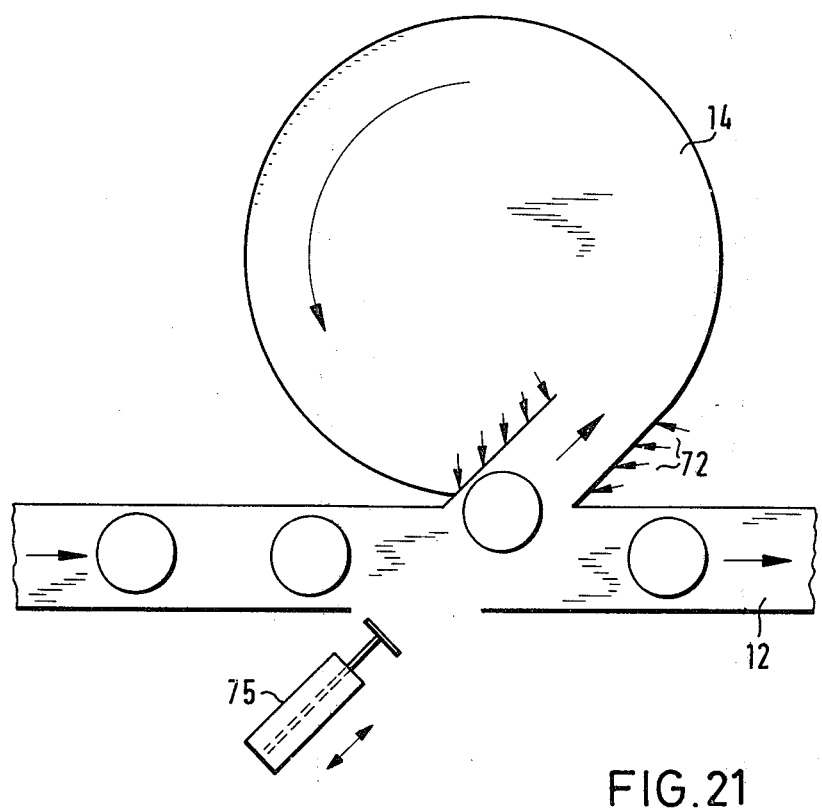
FIG. 21 shows an embodiment in which stabilizer nozzles are provided at either side of a second conveyor means.

The use of stabilizer nozzles is not restricted to deflection by means of the aformentioned embodiments of the deflection apparatus. Articles deflected by other deflecting means, e.g., simple pushers 75, and, in general, articles likely to be toppled at critical points, may also be stabilized, particularly by the provision of air nozzles at either side of a conveyor means (FIG. 21).

In beverage filling systems processing cylindrical bottles, the deflection apparatus of the invention may also be used in conjunction with the star wheel of a filling means, a labelling station, etc. As illustrated in FIG. 11, the deflecting means are so arranged that the bottles may leave the star wheel on the conveyor means 12, when the deflecting means are retracted or switched off, while, when the deflecting means are extended or switched on, the bottles are carried away by the discharge disc to a second conveyor means 14, a turntable, or the like.

The described embodiment with ultrasonic transducers operates reliably for bottle weights between 0.15 and 1.5 kg at conveyor speeds between 0.5 and 1.5 meters per second, or between 0.5 and 2.5 meters/sec. for bottles not exceeding 0.4 kg in weight. In upward direction speeds and weights are relatively uncritical, as the number of nozzles may be increased at will, while light-weight articles are very steeply deflected at slow speeds so that the measuring instruments must answer rigid requirements. For light-weight articles traveling at slow speeds the force of the nozzles of the first 6 segments is preferably attenuated by reducing valves so that their intensities gradually increase. The opposite railing 15 bends directly in the deflection zone (outer railing of the second conveyor means). Furthermore, in the deflection zone it is provided with damping strips 76 (FIG. 23) to prevent the deflected bottles from crashing against the railing 15. The damping strips provided opposite the fourth and the following segments simultaneously serve as switch-off means by affecting inductive proximity switches. In this embodiment the ultrasonic transducers are therefore not required. Such a positive guidance of the deflected bottles permits speed variation from zero upwards.

Figure 12:
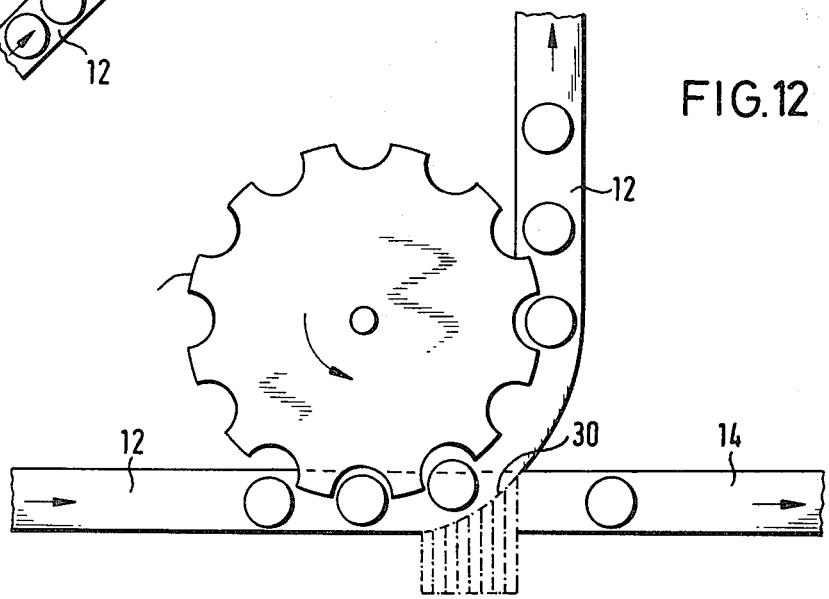
FIG. 12 shows the use of an apparatus as a corner station.

FIG. 12 shows a further possible combination of the deflection apparatus of the invention with a rotary star type conveyor. This arrangement is advantageous particularly in case of congestion. The main stream of the articles is rotated through 90° through the deflection plane 30 and directed onto a conveyor means, while those articles to be deflected which are spotted by a check means continue to travel along a straight path. The above described control method is reversed to this end. Due to the change in direction of the main stream of articles, the congestion of articles occurring, for instance, in a production line remains without effect on the apparatus and may be dealt with during back-up of the articles in the production line.

Figure 13:
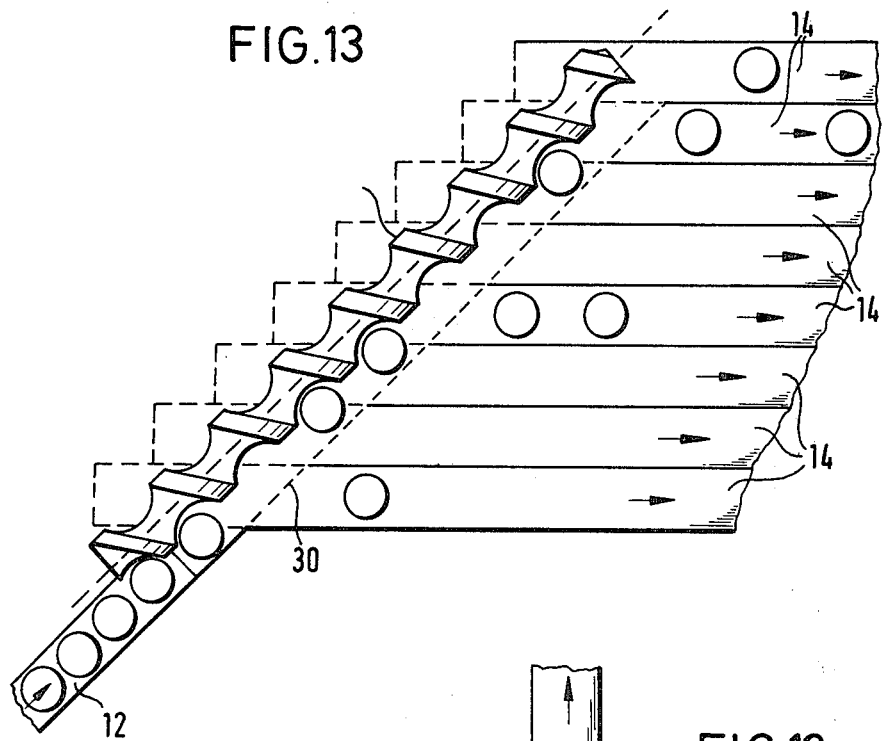
FIG. 13 illustrates an apparatus comprising a plurality of parallel second conveyor means.

The deflection apparatus of the invention may also be so used that the articles are deflected from a first conveyor means selectively to different further conveyor means. To this end, a plurality of apparatuses of the type shown in FIG. 1 may be connected in series. However, it is also possible to adopt the arrangement shown in FIG. 13 in which the articles carried along by a first conveyor means are conveyed between a rotating worm and a plurality of extended or switched-on series of deflecting means up to a predetermined one of the second conveyor means whence it is carried onward by retraction or switch-off of the associated deflecting means. The first conveyor means and the worm move in parallel to the deflection face of the series of deflecting means. The deflecting means in this embodiment are extended preferably vertically downwardly from above.

Another alternative for use of the apparatus will become apparent when the friction between the article and the segment is increased by a high-friction coating applied to the working faces of the segments. The articles thereby may be brought into another position during deflection. (Thus, for instance, cylindrical articles roll off at the deflection plane, while cubes perform one or more quarter rotations about their axes.

Figure 22:
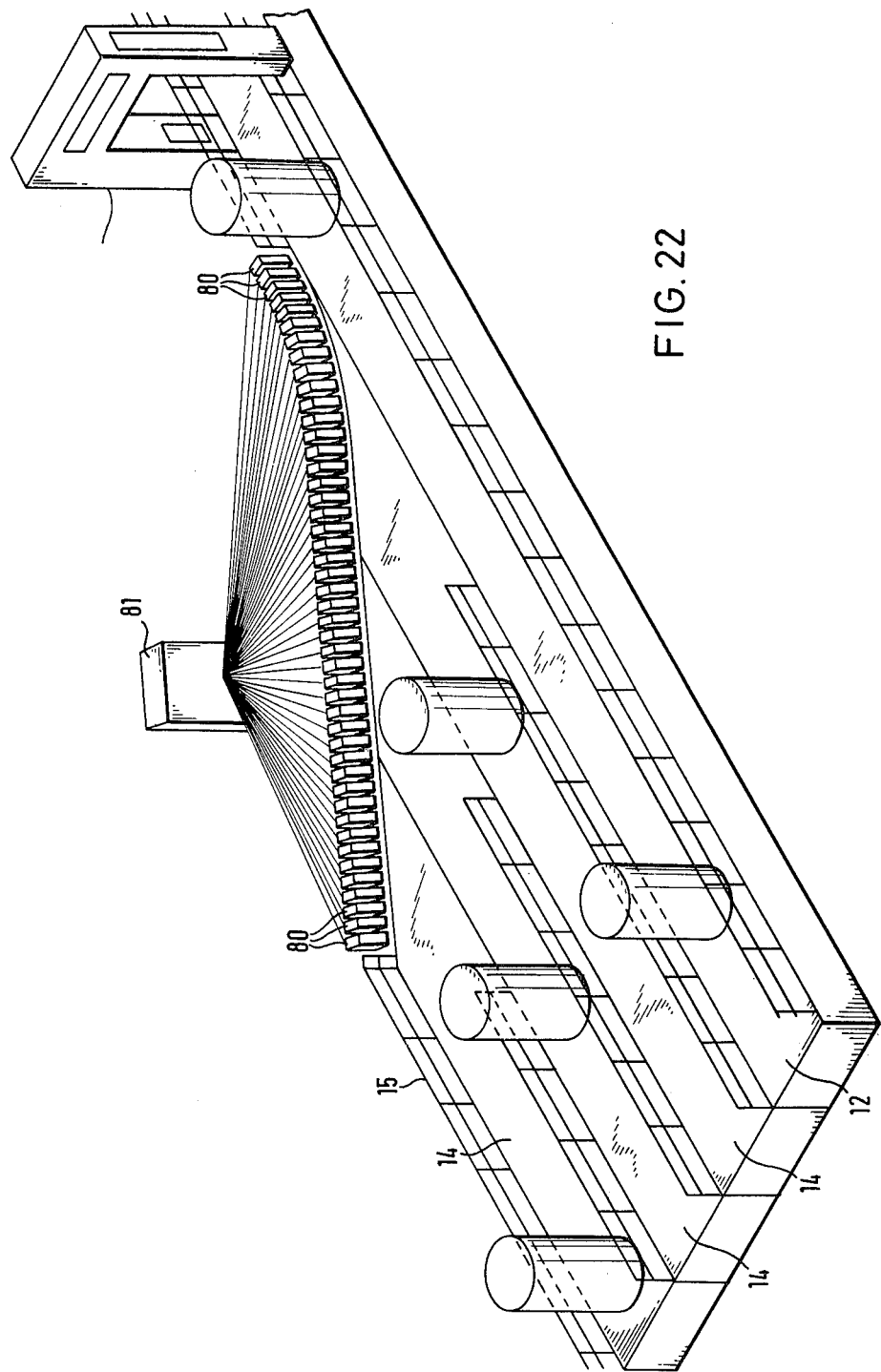
FIG. 22 shows an apparatus according to the invention with deflecting means in the form of suction nozzles.

Up to this point, two basic embodiments have been disclosed for the deflecting means, namely, segments shiftable substantially perpendicular with respect to the direction of travel and gas nozzles. However, other embodiments may also be used e.g., suction nozzles provided at the bend of the railing 15 and deflecting step-wise the articles to be deflected by producing subatmospheric pressure on the side facing away from the second conveyor means (FIG. 22). Articles having pronounced magnetic properties may also be deflected by deflecting means in the form of magnet coils; in such embodiments the magnet coils are also provided in the bend of the railing 15. While in the apparatus operating with fluid nozzles the speed of the virtually accompanying fluid cushion is substantially equal to the speed of the first conveyor means, in the apparatuses operating with suction nozzles 80 and deflecting magnets the speed of the generated field of force is determined by the quotient of the speed of the first conveyor means and the cosine of the angle at which the articles are deflected. Further embodiments will obvious to those skilled in the art.

In the case of electrically charged articles, the deflecting force may also be produced by electric fields, for instance. The electric fields may be generated by a multiplicity of capacitor plates arranged in the outer railings 15, 16. It is essential that the deflecting means be stationary in the direction of travel and that each deflecting means exert a force on an article to be deflected such that said article is deflected by an incremental amount of the total deflection from the first conveyor means to the second conveyor means. The force exerted on the article may be a pushing as well as a pulling force. In addition to control via electrically actuated valves the suction nozzles 80 may be controlled also by way of a rotary slide valve. Shortly before and in the bending portion of the railing 15 a plurality (about 100) of suction nozzles 80 (of about 15 mm width) are arranged in closely adjacent relationship. The feed conduits lead to a rotary slide control 81 which is coupled with the drive for the conveyor means, the transmission ratio corresponding to the cosine of the deflection angle (e.g. 1:1.06). This rotary slide valve control 81 opens and closes the feed conduits to the suction nozzles such that individual zones of subatmospheric pressure (e.g. of about 3 nozzles' width) spaced constant distances (e.g. of about 3 nozzles' width) apart virtually travel along the zone of deflection. Hence, at all times about half of all the suction nozzles is switched on, so that the subatmospheric pressure produced by the suction system remains relatively constant.

The articles arriving on the first conveyor means are periodically fed through a screw into the succession of subatmospheric pressure zones. The periodic feed may also be effected by a plurality of suction nozzles in the initial straight portion of the railing. Thereafter the articles are guided along the suction nozzles in close vicinity thereof. Deflecting means exerting a pulling force are suitable particularly in apparatuses operating with a plurality of second conveyor means. The articles are then guided by a suction means comprising a plurality of suction nozzles and extending across all the second conveyor means up to the desired one of the second conveyor means, and then released. Certain suction nozzles or groups of suction nozzles are provided with pressurized air injectors which may be operated via magnetic valves and which, in activated condition, prevent the build-up of a subatmospheric pressure zone in front of the respective suction nozzle. Hence, the article drawn along the railing may be detached from the suction nozzles at predetermined locations.

In all instances the deflecting means are controlled in the manner described in connection with the air nozzle deflecting means, namely, in response to the further movement of the article to be deflected.

The invention is applicable also in deflection apparatuses where the articles are not advanced on conveyor means but move along a curved path determined, for example, by gravity, or where they fall freely. In classifying broken glass according to color, for instance, glass containers of a given color may be blown onto a second path by deflecting means in the form of gas nozzles to thereby arrive at another collecting station.

EXAMPLE 1

In the following a beverage filling system will be described with reference to FIGS. 3 and 4 which is adapted for filling various types of cylindrical bottles (of 50 to 90 cm diameter) in alternating operation during which the filled bottles are checked as to perfect closure and liquid level whereupon a fit and unfit classification is made.

In the zone of deflection a second conveyor means 14 for carrying off the deflected bottles runs at a distance of about 5 to 10 cm from the first conveyor means 12 in the form of a steel link chain forming the production line. The stationary lateral railing 15 of the first conveyor means 12 turns off in the deflection zone parallel to the deflection face and becomes the outer railing 15 of the second conveyor means 14.

The second railing 16 of the first conveyor means 12 consists of two superposed guide rods 23 slidable inwardly and outwardly perpendicular to the direction of conveyance for adaption to various bottle diameters. Moreover, the two conveyor means have a common stationary railing 17 directly after the zone of deflection to prevent mixing after deflection.

The deflection apparatus itself consists of 9 individually extensible segments 18 in close side-by-side relationship. Each of these segments consist of 3 fingers 22 mounted to a vertical bar 20 such that one can be extended just above the steel link chain, one between, and one above the two guide rods 23. The length of the fingers 22 is determined by the length of the path of extension; thus, for instance, in this embodiment the shortest finger (segment 18a) has a length of about 30 mm, and the longest finger (segment 18i) a length of about 115 mm.

The fingers 22 have tapered front faces such that in extended condition they form a smooth deflecting face forming with the direction of conveyance an angle of about 30°. The first segment 18a has a slight curvature to guide the bottles smoothly from the direction of conveyance into the direction of deflection. Moreover, the first segment 18a has a width of about 28 mm and is somewhat wider than the other 8 segments all of which are 20 mm wide. The direction of extension in this embodiment forms with the direction of conveyance an angle of 105°.

At the above mentioned bar 20, on the side facing away from the fingers 22, a guide rod 27 is mounted to the upper end which is guided in plastic sleeves 27a to thereby stabilize the segments. In about the middle of the bar the piston rod of the pneumatic cylinder 26 used as actuator is connected. The cylinder 26 is controlled by a control valve 28 in the form of an electrically actuated 5/2 way valve.

All the segments and actuators are mounted on a base plate shiftable together with the guide rods of the railing.

For the control the above described principle of control responsive to the articles preceding and succeeding the article to be deflected is employed. The check line positioned about 15 cm upstream of the first segment is a trigger light barrier in this embodiment which sets or does not set flip flop 0 in response to the two checked conditions liquid level/closure.

In order to determine the position of the bottles preceding and succeeding the bottle to be deflected, a 256×1 element CCD camera is employed.

By means of a suitable lens system a horizontal scan line of about 35 cm length commencing about 3 cm downstream of the check line and positioned at about neck level of the type of bottles being sorted is shown on the CCD-IC. An evaluating logical system then tracks the position of the individual bottle necks and derives therefrom the "free" signals and "retract" pulses in consideration of the predetermined bottle diameter, which are then further processed by the circuit system shown on principle in FIG. 2.

Since for smaller bottle diameters the movable railing 16 and the entire apparatus for deflection to the second conveyor means are shifted towards the second conveyor means, not all segments but only those whose tip does not trespass the boundary (stationary railing 17) to the second conveyor means may be extended.

While for 90 mm bottle diameter all 9 segments are extended, for 50 mm diameter only the first 5 segments are extended. The pre-selection of the bottle diameter mentioned before automatically effects the required adaptions.

EXAMPLE 2

A deflection apparatus operating with air nozzles will now be described with reference to FIGS. 16 to 19. Otherwise the statements made in Example 1 are applicable.

The deflection apparatus consists of ten individually operable deflecting means spaced a distance of about 2 cm. The deflection means consist of one upright column each 15 cm in height on which two wide slot nozzles 5 cm in height are so mounted that the longer dimension of the nozzle opening is vertically oriented. Each wide slot nozzle consists of 16 superposed round full jet nozzles of 0.5 mm supplied with pressurized air from a common source. The lower edge of the lower wide slot nozzle is flush with the upper edge of the conveyor means, while the lower edge of the upper wide slot nozzle is located about 10 cm above the level of the conveyor means.

The nozzles are so directed that they blow perpendicularly with respect to the direction of advance and parallel to the plane of the conveyor means.

Both nozzles are connected to a ¼ inch 2/2 way valve by two pipes of equal length, and the intensity of the upper wide slot nozzle is somewhat reduced by a reducing valve in the feed conduit.

All the lower nozzles of the deflecting means blow at equal intensity; and so do the upper ones, but at lower intensity than the lower ones. One ultrasonic transducer 71 each is mounted about 10 cm above the level of the conveyor means between the deflecting means b and c, d and e, f and g, h and i, respectively.

Figures 20A, 20B:
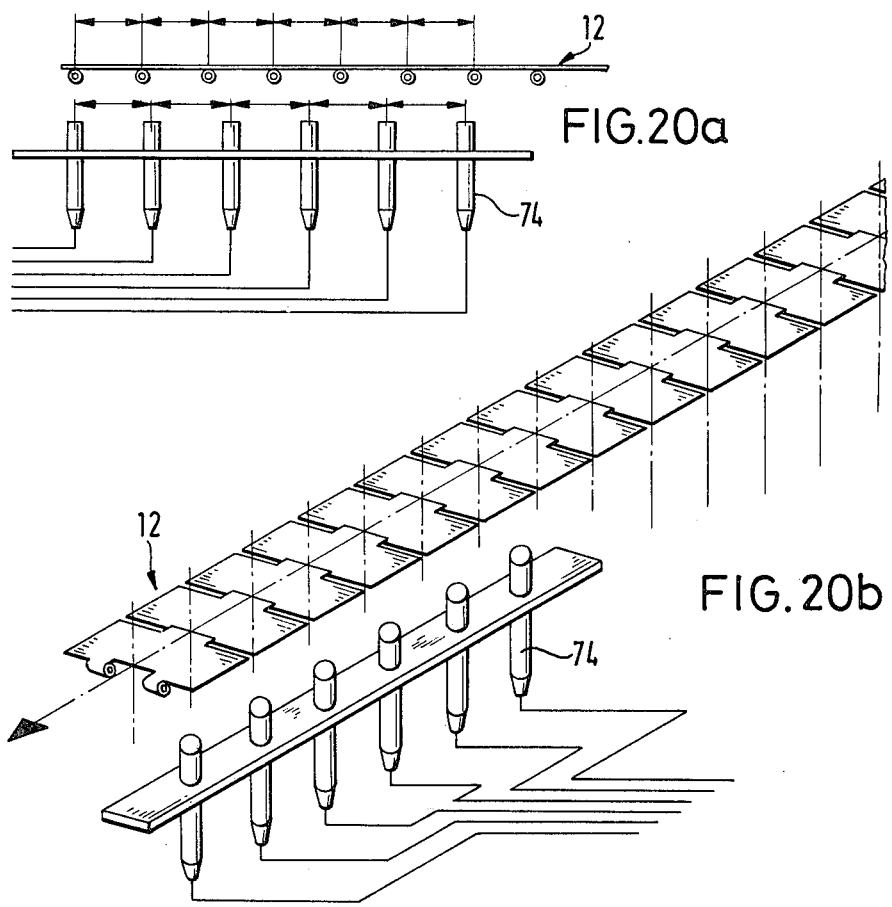
FIGS. 20a and 20b show a multiple inductive sensor for generating the clock pulses required to control the deflecting means.

At a check line 32 (triggering light barrier) located about 15 cm upstream of the first deflecting means it is determined whether or not the two test conditions, liquid level and closure, are fulfilled. If not, the air nozzle control means operating with a microprocessor "remembers" the defective bottle, i.e., the location on the conveyor means (open-link chain) where said bottle stands. By means of a multiple inductive sensor 74 (FIG. 20), one clock signal each is delivered to the control per each 6 mm chain advance.

This multiple inductive sensor (FIG. 20) consists of six individual proximity switches which are mounted closely below the link chain with their centers spaced 44.3 mm apart. The hinges of the link chain sliding over the initiators with their centers spaced 38.1 mm apart then produce the desired clock pulses. By addition of said pulses, the control "knows" precisely when the defective bottle is facing the segment a, b, c, etc.

Furthermore, from the clock pulses of the inductive sensors the speed of travel is computed, and the respective valves are actuated either earlier (fast) or later (slow), depending on the speed of travel.

In case a faulty bottle is to be deflected, successive switch-on of the nozzles produces an accompanying air cushion (air wave). The impingement of the air against the surface of the bottle to be deflected produces sound in the ultrasonic range. Said sound is received by one of the above described transducers, selectively amplified (38 to 40 kcps) by amplifiers, rectified, and compared with a reference value.

If said reference value is not reached, i.e., if the bottle has already been sufficiently deflected, the air nozzle control means prevents further nozzles from being switched on so that the air cushion for the bottle being deflected will disappear. This will happen very early with light-weight bottles travelling at a slow speed, while heavy bottles advanced at a high speed require an air cushion (air wave) accompanying the bottle along the entire deflection zone.

EXAMPLE 3

The embodiment which will now be described is suited for handling cylindrical bottles of 56 mm diameter and has a capacity of up to 50,000 bottles per hour (conveyor speed about 1.5 meter per second).

In contradistinction to the above described Example 1, the bottles that are not to be deflected must not by themselves move on the first conveyor means (no drift). The design of the conveyor means is the same as that in Example 1 with the exception that the railing 16 is interrupted in the zone of deflection.

The deflecting means again consist of 9 individually extensible segments which are arranged in close side-by-side relationship. Each one of the segments consists of a vertical plastic bar of about 100 mm height and about 20 mm width (the first segment of 25 mm width) with 4 projections (sliding noses) along which the bottles slide.

The segments are extended and retracted by double-acting cylinders (16 mm piston diameter) with a piston rod extending through the piston; said cylinders are controlled via electrically actuated 5/2 way valves with rapid venting.

Each of the piston rods carries two springs of 30 mm length. The spring characteristics are dimensioned such that the springs of the first segments (extension path $\approx 6$ mm) are compressed by the force of the piston by about 2 mm, those of the second segment (extension path 11 mm) by about 4 mm, those of the third segment (extension path 17 mm) by about 7 mm, those of the fourth segment (extension path 24 mm) by about 10 mm, those of the fifth segment (extension path 32 mm) and of the following segments by about 12 mm.

Above the cylinders a guide rod is mounted to the segments and connected with its other end to the piston rod by way of a yoke. The cylinders rest in a plastic supporting block which is at the same time a slide bearing for the guide rods.

In extended condition the segments form a parabolic deflection curve having an initial slope of m=0.2 and an extension path of the last segment of about 70 mm ($y = 9.64 \cdot 10^{-4} x^2 + 0.2$ x; dimensions in mm).

In this embodiment the above described principle of control responsive to the article preceding and that succeeding the article to be deflected is used and is realized in a microprocessor program.

At a check line about 15 cm upstream of the first deflecting segment it is determined whether or not the two conditions liquid level/closure are fulfilled.

By way of an 8 fold inductive scanner a clock signal per each 4.76 mm chain advance is delivered to the control. By means of said clock signal and the trigger signal generated by the check means the microprocessor control tracks the course of the bottles that are not to be deflected, or rather their positions on the link chain. Since the diameter of the bottles that are not to be deflected is known (in this case 56 mm) the control, upon a defect signal from the check means, always can extend the maximally possible number of railing segments between two defective bottles. In addition, the control must consider the periods of actuation of the individual segments, since the speed of advance varies constantly (0 to 1.5 meters per second). Depending on the momentaneous speed of travel which is calculated automatically from the time interval between the clock pulses the microprocessor calculates for each individual cylinder the required lead for its triggering instants (retract-extend) and considers it in the control.

What is claimed is:

1. An apparatus for laterally deflecting specific articles selected with respect to one criterion from a first conveyor means to a second conveyor means for the deflected articles, said apparatus comprising:
   (a) deflecting segments each having an oblique working face, said segments being
      (i) stationary in the direction of advance of said articles to be deflected;
      (ii) extensible and retractable in such a manner that the working faces of individual segments are flush with the working faces of the preceding segments and together form a deflecting surface leading from said first conveyor means to said second conveyor means; and
      (iii) the width of each segment being less than about one-half of the sum of the dimension of the articles in the direction of advance and their distances from each other;
   (b) operating means which operate on the individual segments to extend and retract them;
   (c) detecting means which generate control signals each time an article passes the same; and
   (d) delay means which delay the control signals in response to the velocity of said conveyor means, the distance between said detecting means and each of said individual deflecting segments, and the reaction time and the extending and retracting time of said segments, whereby at any given point in time only those segments are extended or will be extended which at this point in time or immediately thereafter are necessary for deflecting an article, and whereby said segments do not move at the time an article which is to be deflected is contacting said segments.

2. Apparatus according to claim 1, wherein said segments (18n) comprise a plurality of horizontal fingers (22) mounted to a vertical bar (20), the length of said fingers exceeding the length of the path of segment extension.

3. Apparatus according to claim 1, wherein the extension of the segments is a translational movement.

4. Apparatus according to claim 1, wherein the extension of the segments is a rotational movement.

5. Apparatus according to any one of claims 1, 2, 3, and 4, wherein said segments (18n; 58n) are retracted and extended by means of double-acting cylinders (26) having pistons (25) said pistons being held in their end positions by pressure fluid against the force of springs (29) and being further accelerated by said springs (29) during retraction and extension, respectively.

6. Apparatus according to any one of claims 1, 2, 3 and 4, comprising at least one sensing and control means (light barriers 34 and 35) deriving a "free" signal for each deflecting means from an article of the group to activate the respective segment immediately before the article to be deflected reaches said deflecting means, and a "retract" command to inactivate said deflecting means when the article being deflected leaves said deflecting means.

7. Apparatus according to claim 1, comprising at least one sensing and control means (light barriers 34 and 35) deriving a "free" signal from each article for each deflecting means by which signal said deflecting means is or remains activated if the next succeding article is also to be deflected, and deriving from each article for each deflecting means a "retract" command by which said deflecting means is inactivated unless said article is to be deflected.

8. Apparatus according to any one of claims 1, 2, 3, 4, and 7, wherein said second conveyor means is a rotary star-type conveyor.

* * * * *